United States Patent
Nies

(10) Patent No.: US 12,196,182 B2
(45) Date of Patent: Jan. 14, 2025

(54) USING A ROTOR LOCK PLATE FOR REDISTRIBUTION OF SHAFT WEIGHT AND LOADS

(71) Applicant: General Electric Renovables Espana, S.L., Barcelona (ES)

(72) Inventor: Jacob Johannes Nies, Hertme (NL)

(73) Assignee: General Electric Renovables España S.L., Barcelona (ES)

(*) Notice: Subject to any disclaimer, the term of this patent is extended or adjusted under 35 U.S.C. 154(b) by 0 days.

(21) Appl. No.: 18/311,580

(22) Filed: May 3, 2023

(65) Prior Publication Data

US 2023/0358213 A1 Nov. 9, 2023

(30) Foreign Application Priority Data

May 4, 2022 (EP) ..................................... 22171627

(51) Int. Cl.
*F03D 80/50* (2016.01)
*F03D 80/70* (2016.01)

(52) U.S. Cl.
CPC ............. *F03D 80/50* (2016.05); *F03D 80/70* (2016.05); *F05B 2230/61* (2013.01); *F05B 2260/31* (2020.08)

(58) Field of Classification Search
CPC ........ F03D 1/141; F03D 80/50; F03D 80/501; F03D 80/504; F03D 80/505; F03D 80/70; F03D 80/703; F03D 80/88; F03D 80/881; F05B 2260/31; F05B 2230/61
See application file for complete search history.

(56) References Cited

U.S. PATENT DOCUMENTS

| 8,556,591 B2 | 10/2013 | Koronkiewicz |
| 10,454,342 B2 * | 10/2019 | Eriksen ................. H02K 7/183 |
| 10,830,209 B2 * | 11/2020 | Larsen .................. F03D 7/0264 |

(Continued)

FOREIGN PATENT DOCUMENTS

| DE | 4104454 C1 | 7/1992 |
| EP | 2381092 A2 | 10/2011 |

(Continued)

OTHER PUBLICATIONS

Machine Translation of DE 4,104,454 C1, Retrieved from ESPACENET on Sep. 4, 2024 (Year: 2024).*

(Continued)

*Primary Examiner* — Sang K Kim
(74) *Attorney, Agent, or Firm* — Dority & Manning, P.A.

(57) ABSTRACT

A wind turbine has a main shaft line with a main shaft, a rotor hub, and a rotor lock plate having an opening for receiving a pin, and a nacelle having a bed plate. A multi-part main bearing has a housing, an inner ring, and an outer ring. A pin is moveable between a first, second, and third position, and is retracted from the opening in the first position so that the main shaft line is rotatable. The pin is inserted into the opening in the second position so that the main shaft line is not rotatable. In the third position, the pin is shifted and the main shaft line is supported by the pin such that the weight of shaft and loads on the main shaft are not transmitted through the multi-part main bearing but are transferred via the rotor lock plate and the pin to the bed plate.

10 Claims, 13 Drawing Sheets

(56) References Cited

Figure 1:
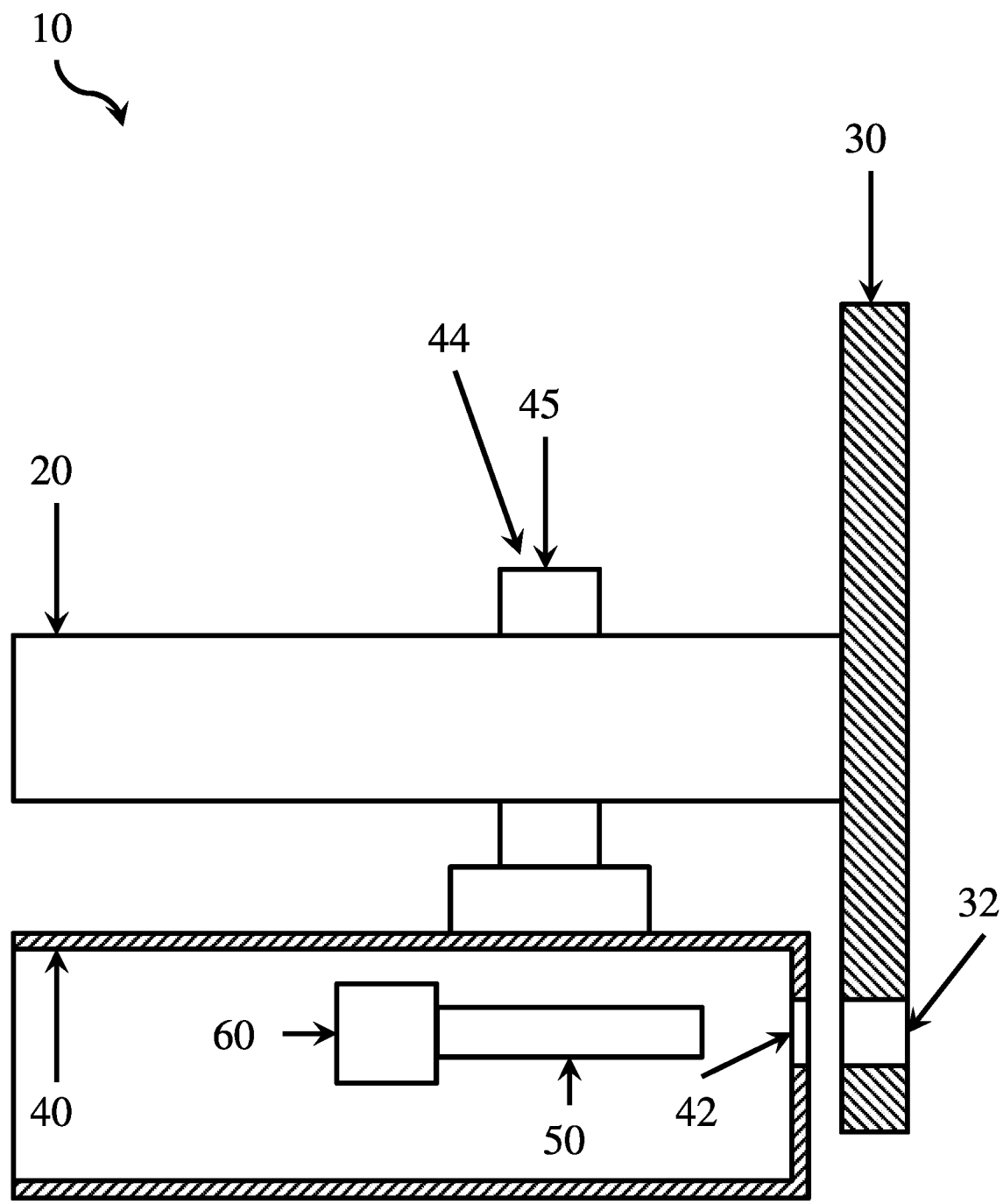

U.S. PATENT DOCUMENTS 10,851,764 B2    12/2020  Lohan et al.
11,384,740 B2 *  7/2022   Levin ..................... F03D 80/50

FOREIGN PATENT DOCUMENTS

EP        3504424   A1   7/2019
WO   WO2015051374  A1   4/2015

OTHER PUBLICATIONS

European Search Report Corresponding to EP22171627 on Oct. 19, 2022.
European Search Report Corresponding to EP22171627 on Jan. 24, 2023.

* cited by examiner

A-A

USING A ROTOR LOCK PLATE FOR REDISTRIBUTION OF SHAFT WEIGHT AND LOADS

TECHNICAL AREA

The present disclosure relates to wind turbine with a multi-part main bearing wherein the weight and loads of the main shaft line can be redistributed so that the main bearing becomes load-less as well as a method for performing a maintenance or repair procedure, including replacement, on the multi-part main bearing.

TECHNICAL BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

The main bearing of a wind turbine, which supports the rotor hub, is one of the most stressed parts within a wind turbine. Therefore, constant maintenance, repair, and operations (MRO) tasks have to be carried out to ensure the intended and optimal use and performance of the main bearing since failure of the main bearing directly translates to failure and/or downtime of the whole wind turbine. These tasks are enormously demanding considering the location of the main bearing on top of the wind turbine tower within the nacelle, especially when the wind turbines are situated in rough terrain or off-shore. This becomes evidently clear when considering that each and every maintenance equipment or replacement part has to be lifted from ground level to the nacelle. Also, the service hatch of the nacelle is rather small which limits the size of all before-mentioned parts which have to be lifted to the nacelle. Furthermore, the room available for performing such tasks is very limited due to the space constrains within the nacelle. This becomes even more challenging in case a main bearing breaks down and has to be replaced entirely.

Thus, the art is continuously seeking new and improved systems and methods that address the aforementioned issues. As such, the present disclosure is directed to systems and methods for redistribution of the weight and loads of the main shaft line so that the main bearing becomes load-less and MRO tasks can be performed as well as a method for performing a maintenance or repair procedure, including replacement, on the multi-part main bearing.

BRIEF DISCUSSION OF THE PRESENT INVENTION

The problems noted above are solved by a wind turbine with a multi-part main bearing as described and claimed herein. Also, the problem is solved by a method for performing a maintenance or repair procedure, including replacement, on the multi-part main bearing as described and claimed herein. Further embodiments, modifications and improvements will be apparent from the following description and the accompanying drawings and claims, or may be learned through practice of the invention.

According to one aspect of the invention, a wind turbine is provided, the wind turbine comprising:
a main shaft line, the main shaft line comprising, a main shaft, a rotor hub, a rotor lock plate with an excentre ring, the excentre ring comprising at least one opening for receiving at least one pin;
a nacelle, the nacelle comprising, a bed plate; a multi-part main bearing, the multi-part main bearing comprising a multi-part main bearing housing, and a multi-part main bearing inner ring, and a multi-part main bearing outer ring; and at least one pin, wherein the pin is moveable between a first position, a second position, and a third position, wherein the pin is retracted from the at least one opening in the first position so that the main shaft line is rotatable, and wherein the pin is inserted into the opening in the second position so that the main shaft line is not rotatable, and wherein, in the third position, a pin is shifted with respect to the second position so that the weight of the main shaft line is supported by the at least pin and so that weight of the main shaft and loads on the main shaft are no longer transmitted through the multi-part main bearing and transferred via the rotor lock plate, the at least one pin to the bed plate.

According to another aspect of the invention, a wind turbine is provided, the wind turbine comprising:
a main shaft line, the main shaft line comprising, a main shaft, a rotor hub, a rotor lock plate with an excentre ring, the excentre ring comprising at least one opening for receiving at least one pin;
a nacelle, the nacelle comprising, a bed plate; a multi-part main bearing, the multi-part main bearing comprising a multi-part main bearing housing, a multi-part main bearing inner ring, and a multi-part main bearing outer ring, wherein the main bearing housing comprises a support which rests on the bed plate, the support comprising a first part connected to the multi-part main bearing and a second part abutting the bed plate, wherein the second part is wedge-shaped and is removable between the first part and the bed plate; and at least one pin, wherein the pin is moveable between a first position, and a second position, wherein when the pin is retracted from the at least one opening in the first position so that the main shaft line is rotatable, and where the pin is inserted into the opening in the second position so that the main shaft line is not rotatable.

According to yet another aspect of the invention, a wind turbine is provided, the wind turbine comprising:
a main shaft line, the main shaft line comprising, a main shaft, a rotor hub, a rotor lock plate with an excentre ring, the excentre ring comprising at least one opening for receiving at least one pin;
a nacelle, the nacelle comprising, a bed plate; a multi-part main bearing, the multi-part main bearing comprising a multi-part main bearing housing, and a multi-part main bearing inner ring, and a multi-part main bearing outer ring; and at least one pin, wherein the pin has an integrated pin actuator, the at least one pin is moveable between a first position, a second position, and a third position, wherein the pin is retracted from the at least one opening in the first position so that the main shaft line is rotatable, and wherein the pin is inserted into the opening in the second position so that the main shaft line is not rotatable, and wherein, in the third position, the integrated pin actuator is actuated so that the at least one pin is shifted with respect to the second position so that the weight of the main shaft line is supported by the at least pin and so that weight of the main shaft and loads on the main shaft are no longer transmitted through the multi-part main bearing and transferred via the rotor lock plate, the at least one pin to the bed plate.

According to still another aspect of the invention, a method is provided performing a maintenance and/or repair procedure, including the replacement of the multi-part main bearing of a wind turbine, the method comprising:

inserting at least one pin into at least one opening of the excentre ring of the rotor hub so that the main shaft line is not rotatable;

supporting the main shaft line via the at least one pin, wherein the at least one pin connects the main shaft line via the rotor lock plate to the bed plate and thereby making the multi-part main bearing no longer supporting the main shaft line;

disengaging contact between the multi-part main bearing housing and the bed plate; and performing a maintenance or repair procedure, including the replacement, on the multi-part main bearing.

According to one advantageous aspect of the invention, the at least one pin connects the main shaft line via the rotor lock plate to the bed plate.

According to one advantageous aspect of the invention, the wind turbine further comprises a pin actuator, wherein the pin actuator actuates the at least one pin in a linear motion, a rotational motion or a combination of a linear motion and a rotational motion.

BRIEF DISCUSSION OF THE FIGURES

In the following, the invention is explained in more detail with reference to embodiments, without these being intended to limit the scope of protection defined by the claims.

The accompanying drawings illustrate embodiments and, together with the description, serve to explain the principles of the invention. The elements of the drawings are relative to each other and not necessarily to scale. Identical reference signs designate correspondingly similar parts.

The figures show:

FIG. 1: A wind turbine with at least one pin, the at least one pin situated in the first position.

Figure 2:
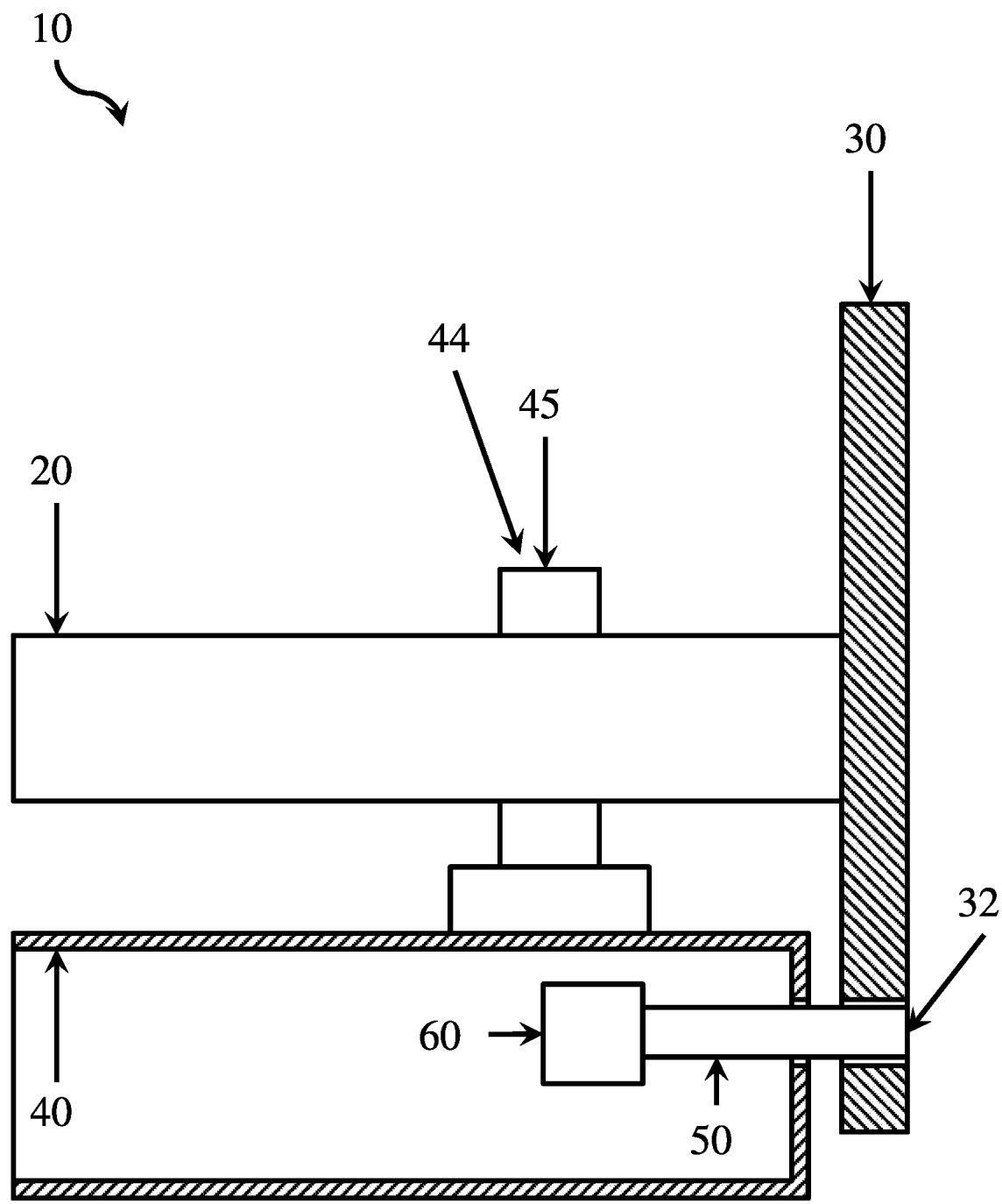

FIG. 2: A wind turbine with at least one pin, the at least one pin situated in the second position.

Figure 3:
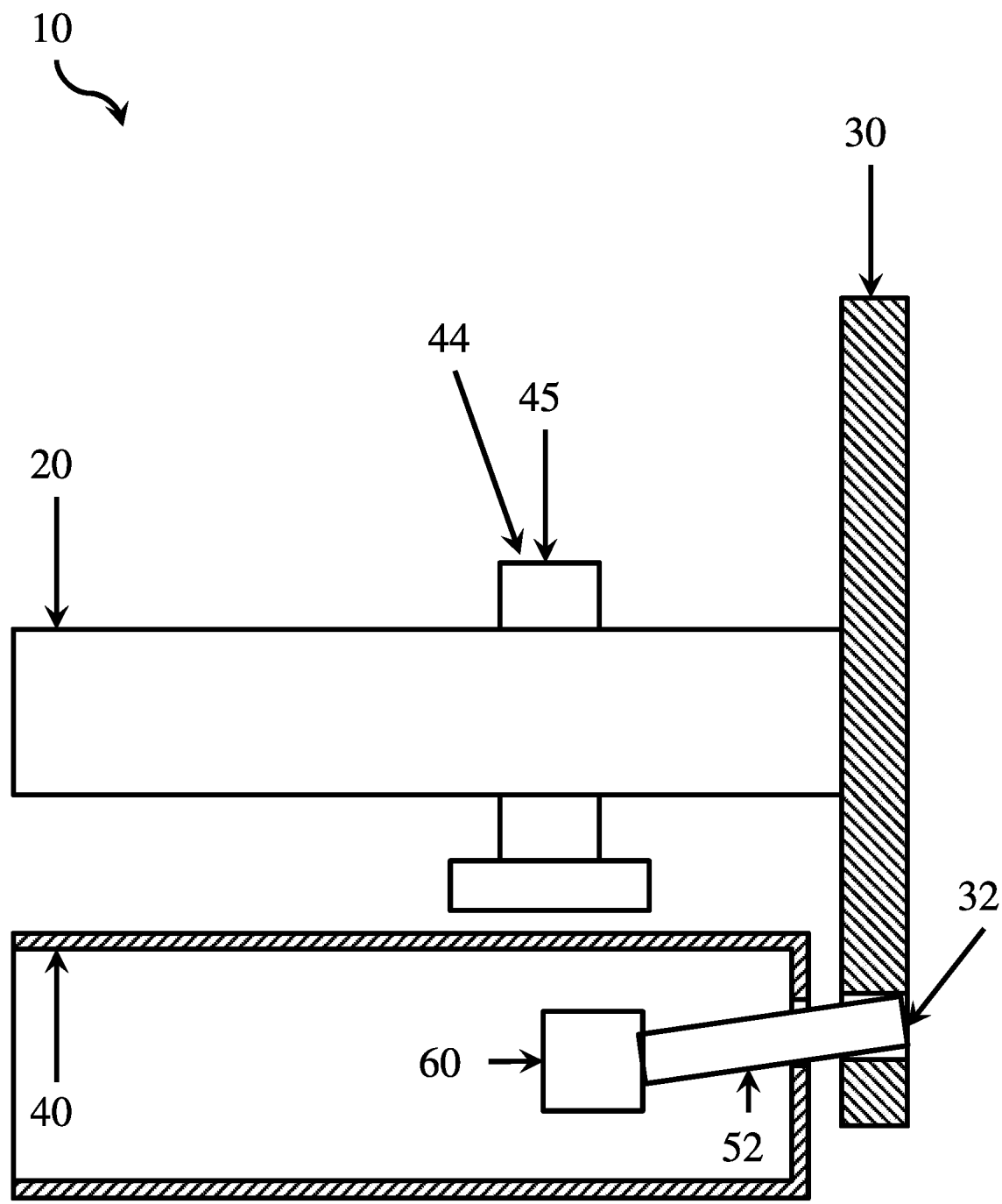

FIG. 3: A wind turbine with at least one pin, the at least one pin being a component of the pin-leaver-mechanism and the at least one pin situated in the third position.

Figure 4:
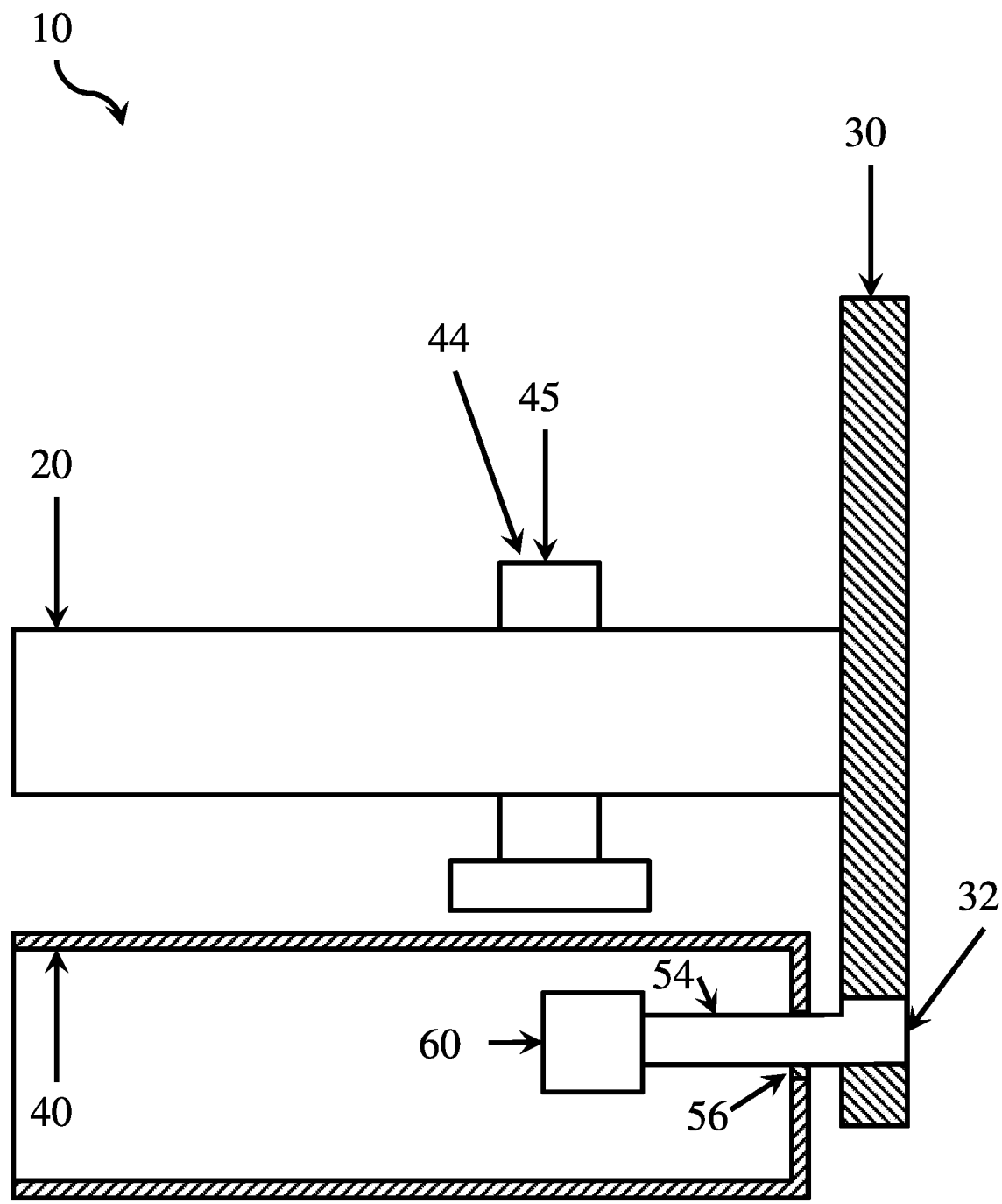

FIG. 4: A wind turbine with at least one pin, the at least one pin being a component of the pin-excentre-mechanism and the at least one pin situated in the third position and a socket of the pin-excentre-mechanism situated in the bed plate.

Figure 5:
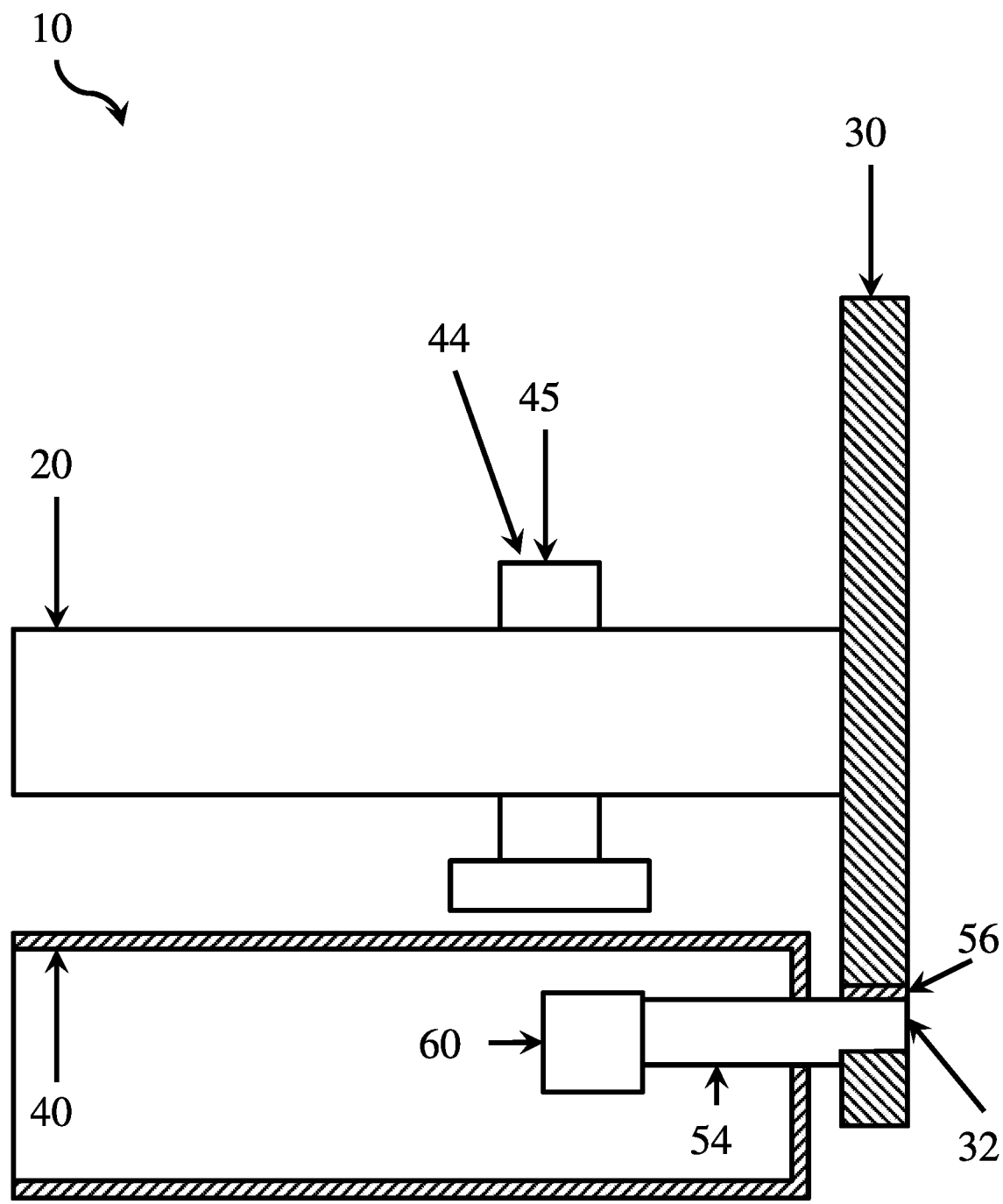

FIG. 5: A wind turbine with at least one pin, the at least one pin being a component of the pin-excentre-mechanism and the at least one pin situated in the third position and a socket of the pin-excentre-mechanism situated in the rotor lock plate.

Figure 6A:
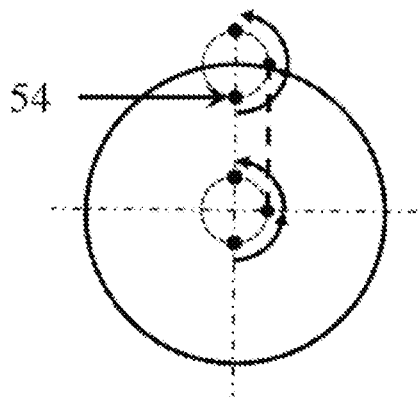

FIG. 6A: An embodiment wherein one pin in the uppermost opening of the rotor lock plate is rotated 180 degrees counter-clockwise.

Figure 6B:
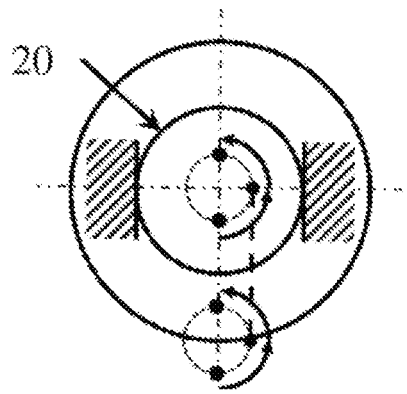

FIG. 6B: An embodiment wherein one pin in the lowermost opening of the rotor lock plate is rotated 180 degrees counter-clockwise.

Figure 6C:
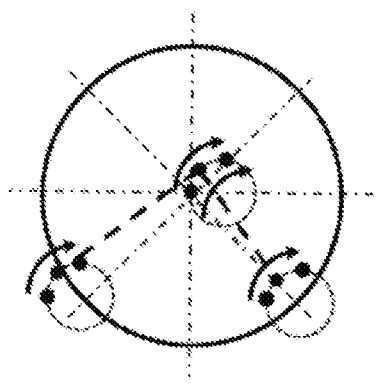

FIG. 6C: An embodiment wherein two pins in the third and forth quadrant of the bore belt ring are simultaneously rotated 90 degrees clockwise.

Figure 6D:
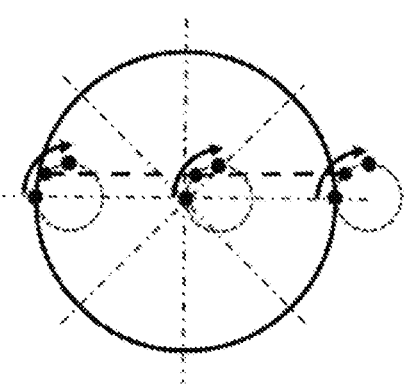

FIG. 6D: An embodiment wherein two pins on the horizontal centerline of the bore belt ring are simultaneously rotated 90 degrees clockwise.

Figure 6E:
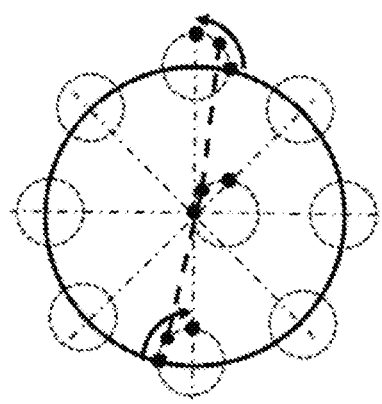

FIG. 6E: An embodiment wherein two pins on the vertical centerline of the bore belt ring are simultaneously rotated, the upper pin rotated 90 degrees counter-clockwise and the lower pin rotated 90 degrees clockwise.

Figure 6F:
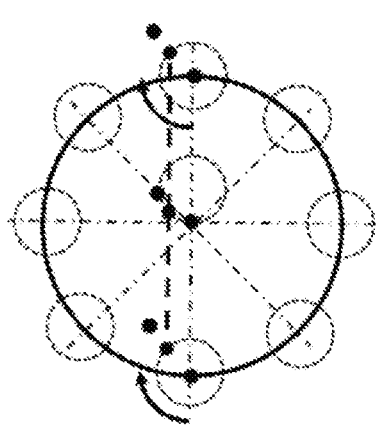

FIG. 6F: An embodiment wherein two pins on the vertical centerline of the bore belt ring are simultaneously rotated degrees clockwise FIG. 7: A wind turbine with at least one pin, the at least one pin featuring an integrated pin actuator and the at least one pin with integrated pin actuator situated in the second position.

Figure 7:
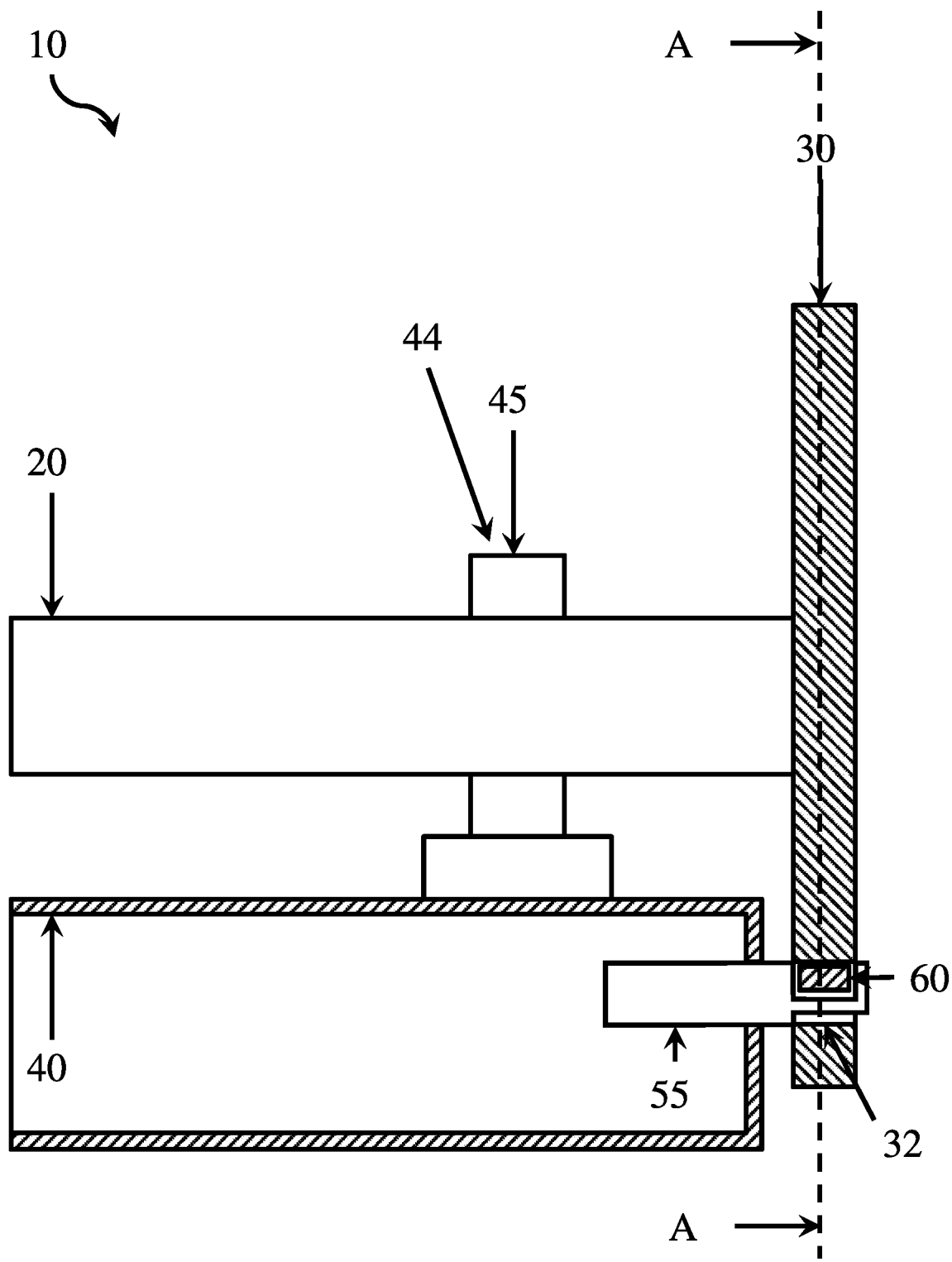
Figure 8A:
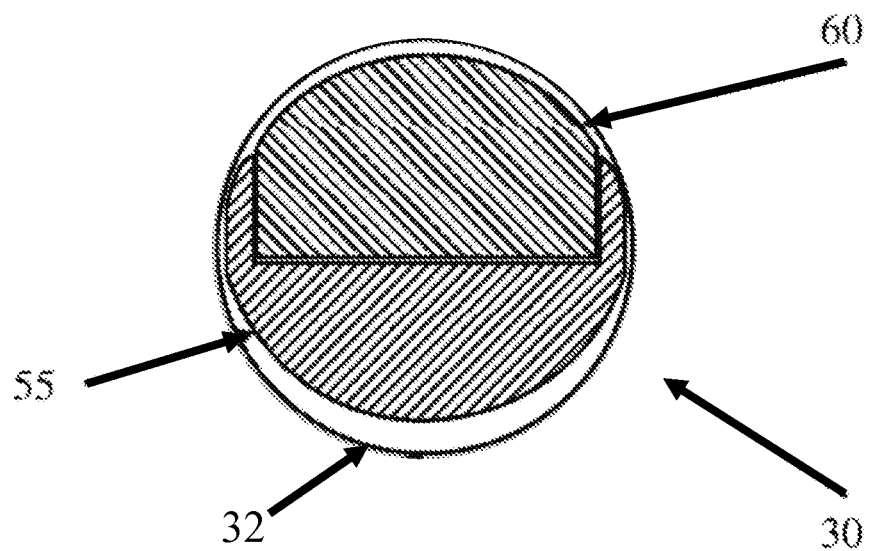
Figure 8B:
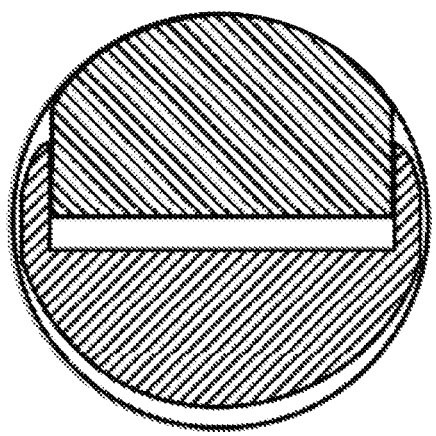
Figure 8C:
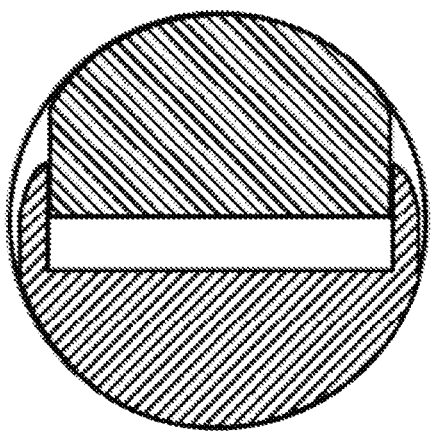

FIGS. 8A through 8C: Sequential details of sectional views AA of FIG. 7 showing a wind turbine with at least one pin with integrated pin actuator, the at least one pin with integrated pin actuator situated in its second position and transitioning to its third position.

Figure 9:
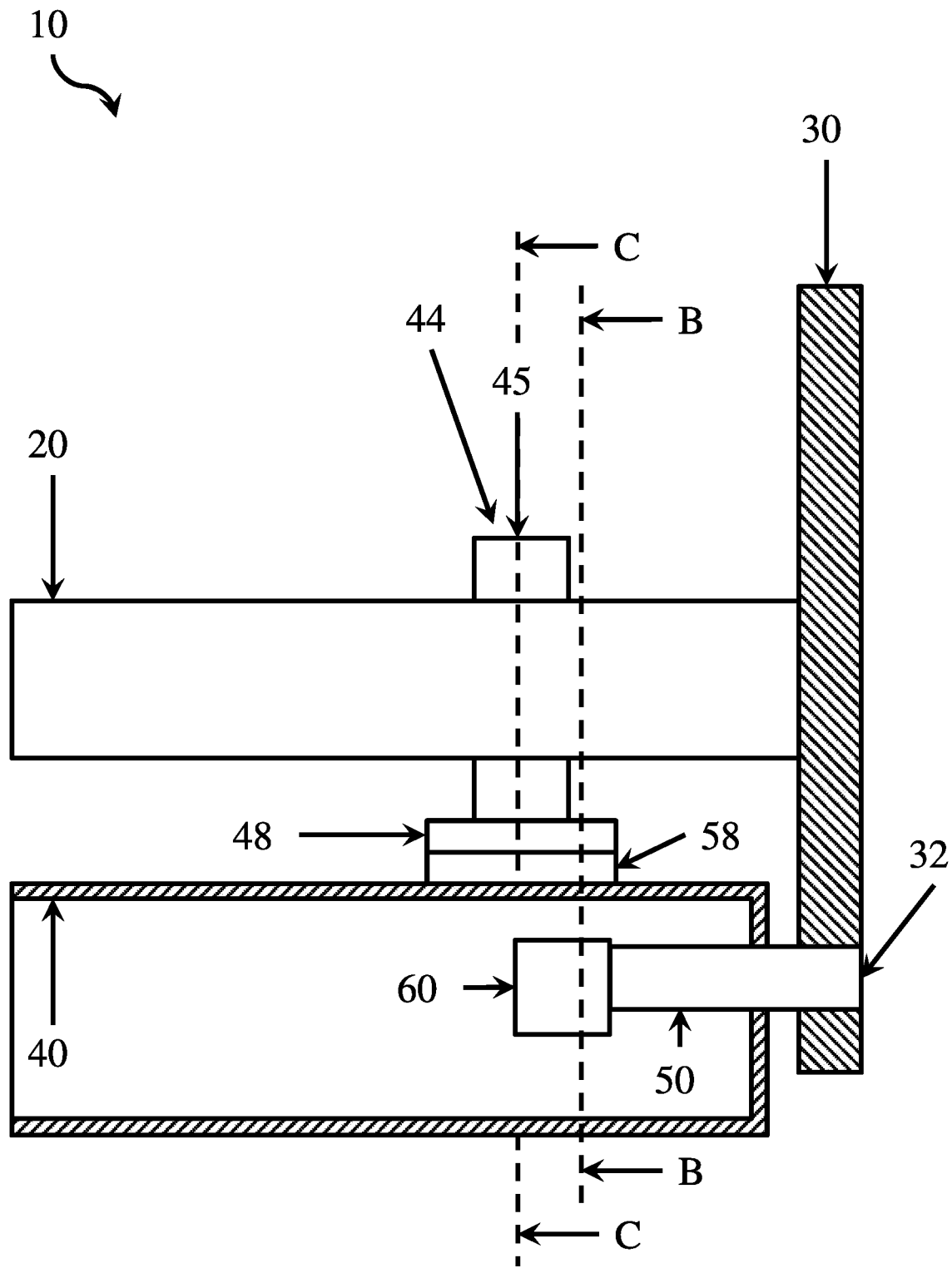

FIG. 9: A wind turbine with at least one pin, the at least one pin situated in the second position and the wedge-shaped part supporting the multi-part main bearing.

Figure 10:
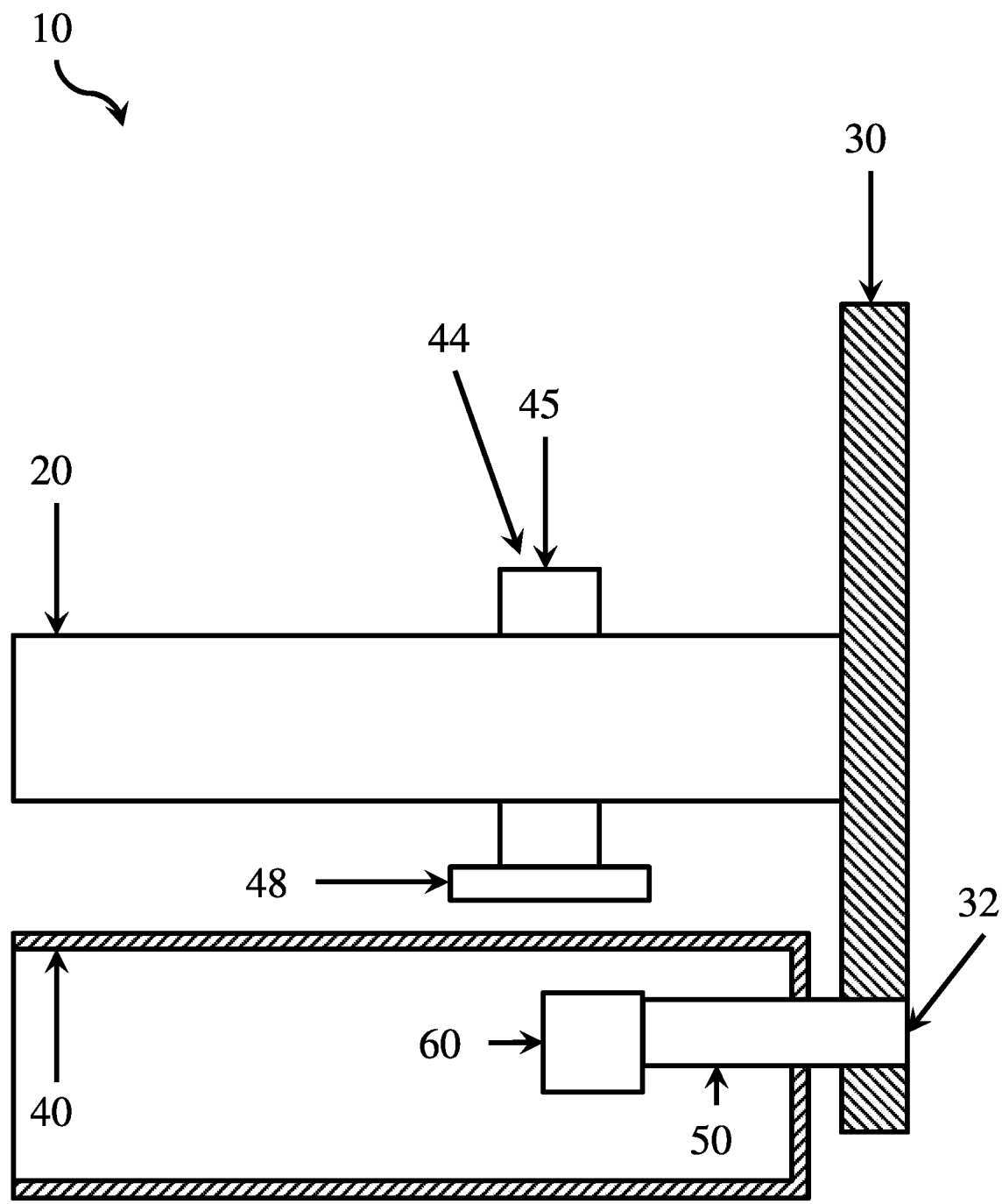

FIG. 10: A wind turbine with at least one pin, the at least one pin situated in the second position and the wedge-shape part removed.

Figure 11:
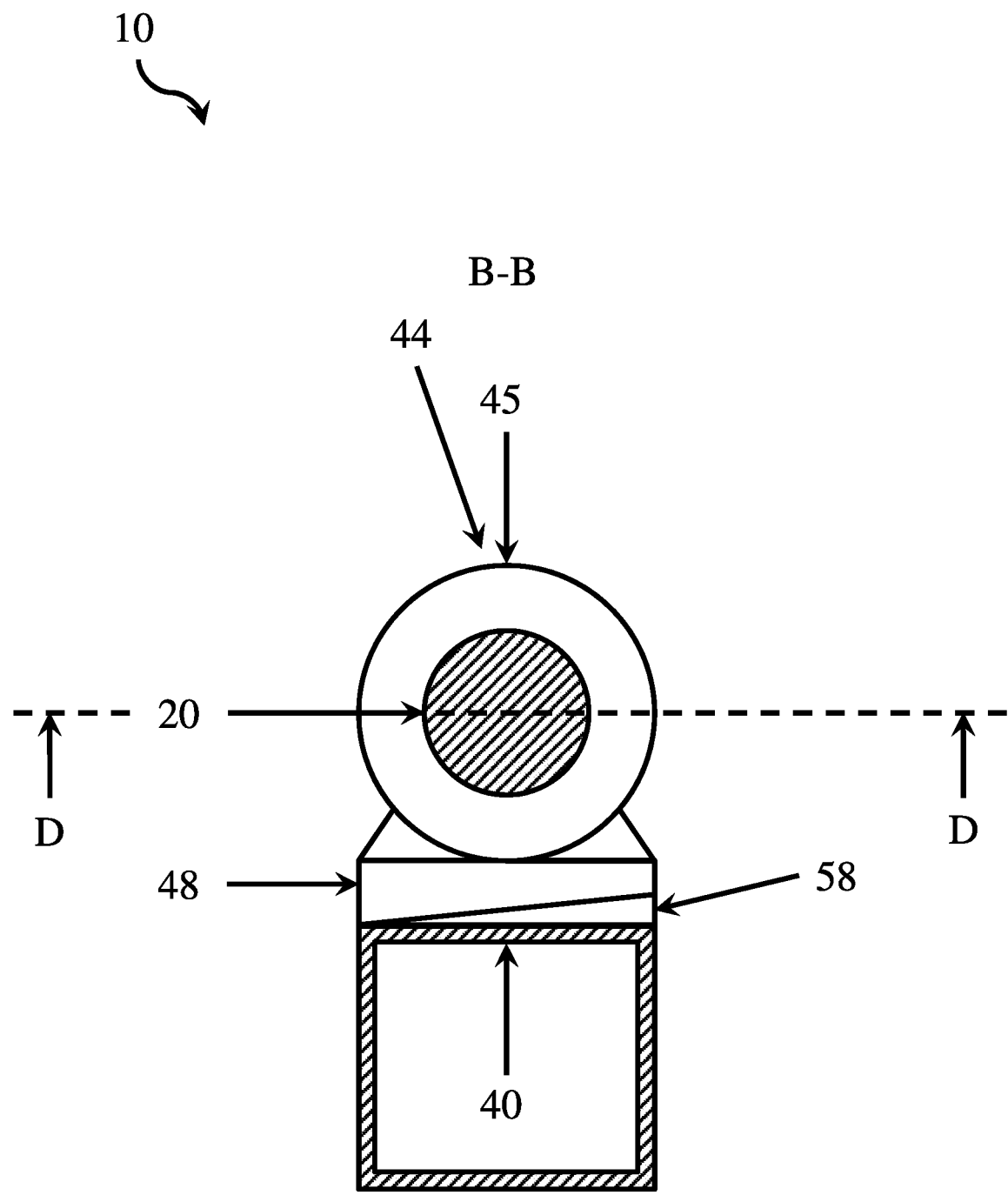

FIG. 11: A sectional view B-B of FIG. 9 showing a wind turbine with at least one pin, the at least one pin situated in the second position and the wedge-shaped part supporting the multi-part main bearing.

Figure 12A:
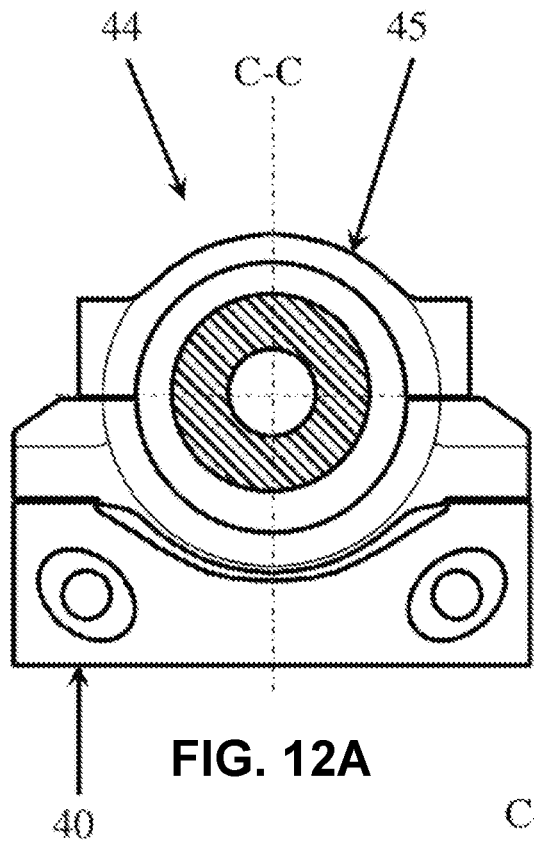

FIG. 12A: An embodiment wherein the multi-part main bearing is shown in its assembled state with the multi-part main bearing housing having a split in the horizontal direction.

Figure 12B:
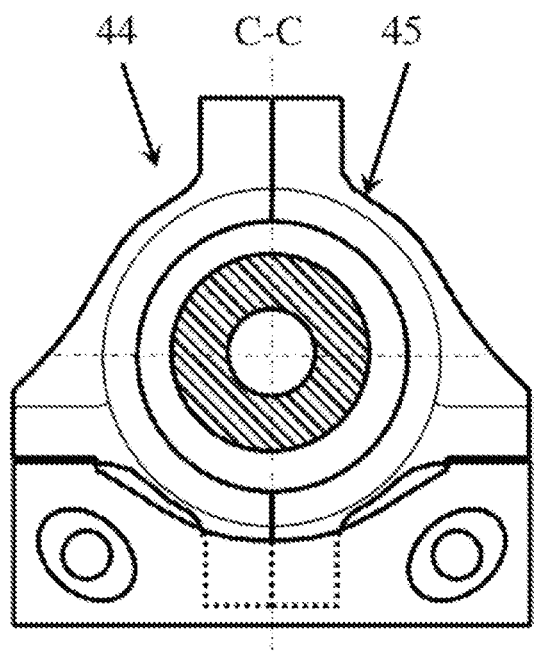

FIG. 12B: An embodiment wherein the multi-part main bearing is shown in its assembled state with the multi-part main bearing housing having a split in the vertical direction.

Figure 12C:
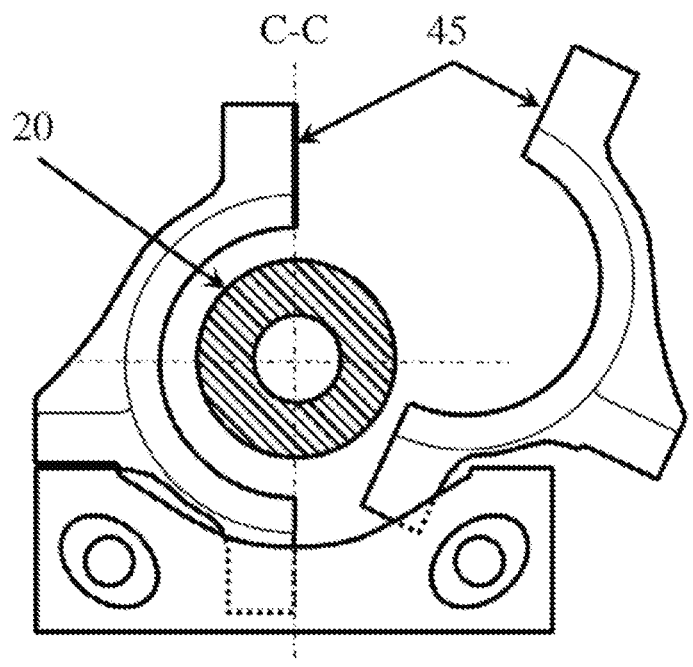

FIG. 12C: The embodiment of FIG. 12B shown in its disassembled state.

Figure 13A:
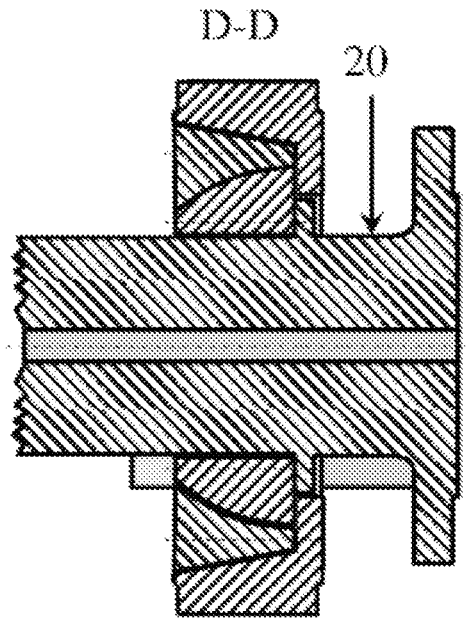
Figure 13B:
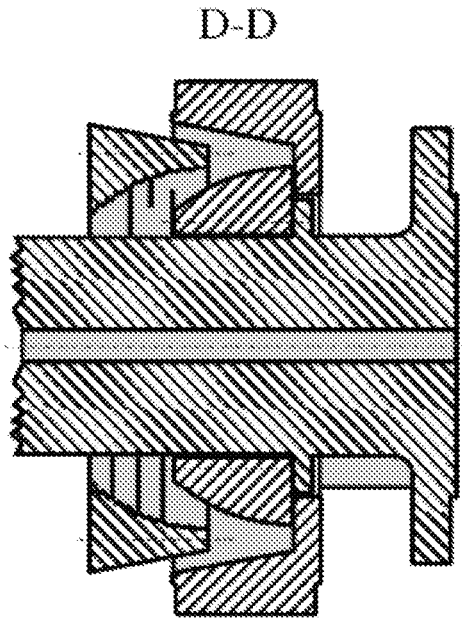
Figure 13C:
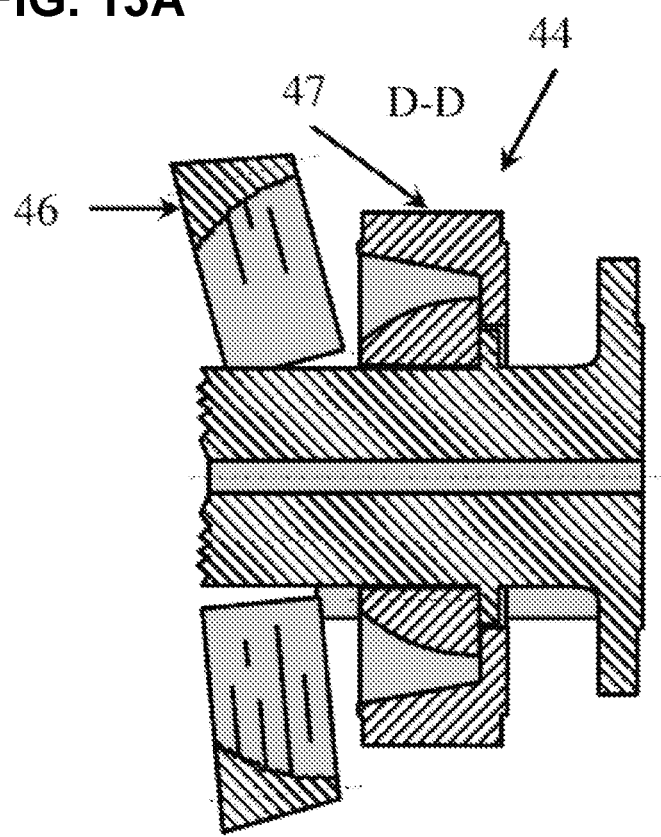

FIGS. 13A through 13C: Sequential views of the multi-part main bearing from is assembled state to a disassembled state.

DETAILED DISCUSSION OF THE FIGURES

FIG. 1 shows a wind turbine 10 comprising a main shaft line and a nacelle. The main shaft line comprises a main shaft 20, a rotor lock plate 30 with an excentre ring, the excentre ring comprising at least one opening 32 for receiving at least one pin 50 and the excentre ring being eccentric with regards to the center-line of the at least one opening 32. The nacelle comprises a bed plate 40 with at least one opening 42 for receiving at least one pin 50, a multi-part main bearing 44, and at least one pin 50. The at least one pin 50 can have any suitable form and shape, including, but not limited to, circular cross-section, elliptical cross-section, squared cross-section, rectangular cross-section, or any other closed curvature cross-section. Also, the at least one pin 50 can have none or one or more shoulders along its main axis, including one or more eccentric portions which differ from their respective center-lines. Furthermore, the outer shape, geometry and size of the at least one pin 50 and inner shape, geometry and size of the at least one opening 32 of the excentre ring of the rotor lock plate 30 can correspond (transition fit) or differ (loose fit or interference fit). The multi-part main bearing 44 comprises a multi-part main bearing housing 45, a multi-part main bearing inner ring 46 (shown in FIG. 10), and a multi-part main bearing outer ring 47 (shown in FIG. 10), where the multi-part main bearing 44 is mounted via the multi-part main bearing housing 45 to the bed plate 40. FIG. 1 shows the at least one pin 50 in its first position which is retracted from the at least one opening 32 of the excentre ring of the rotor lock plate 30 so that the main shaft line is rotatable.

FIG. 2 shows the wind turbine of FIG. 1. In FIG. 2 the at least one pin 50 in its second position which is inserted in the at least one opening 32 of the excentre ring of the rotor lock plate 30 so that the main shaft line is not rotatable.

FIG. 3 shows the wind turbine of FIG. 1. In FIG. 3 the at least one pin 52 in its third position which is shifted with respect to the pins 52 second position so that the weight of the main shaft line is supported by the pin 52 and so that weight of the main shaft 20 and loads on the main shaft 20 are no longer transmitted through the multi-part main bearing 44 and transferred via the rotor lock plate 30, the pin 52 to the bed plate 40. The at least one pin 52 can have any suitable form and shape, including, but not limited to, circular cross-section, elliptical cross-section, squared cross-section, rectangular cross-section, or any other closed curvature cross-section. Also, the at least one pin 52 can have none or one or more shoulders along its main axis, including one or more eccentric portions which differ from their respective center-line. Furthermore, the outer shape, geometry and size of the at least one pin 52 and inner shape, geometry and size of the at least one opening 32 of the excentre ring of the rotor lock plate 30 can correspond (transition fit) or differ (loose fit or interference fit). The shifting of the at least one pin 52 from its second to its third position is performed by a pin actuator 60, wherein the pin actuator 60 actuates the at least one pin 52 in a linear motion, a rotational motion or a combination of linear motion and a rotational motion. The pin actuator 60 can be driven by a hydraulic system, a pneumatic system, an electrical system, or a combination of these. The hydraulic system, pneumatic system, electrical system, or combination of these can drive the pin actuator 60 directly or via a separate drive train system. Due to the actuation of the at least one pin 52 the at least one pin 52 acts as a lever with the corresponding at least one opening 42 of the bed plate 40 acting as thrust bearing. Therefore, the direct physical contact between bed plate 40 and multi-part main bearing 44 is disengaged.

FIG. 4 shows a wind turbine 10 according to another embodiment of the invention. In this embodiment an at least one eccentric pin 54 is used. The at least one pin 54 can have any suitable form and shape, including, but not limited to, circular cross-section, elliptical cross-section, squared cross-section, rectangular cross-section, or any other closed curvature cross-section. Also, the at least one pin 54 has one or more shoulders along its main axis, including one or more eccentric portions which differ from their respective center-lines. Furthermore, the outer shape, geometry and size of the at least one pin 54 and inner shape, geometry and size of the at least one opening 32 of the excentre ring of the rotor lock plate 30 can correspond (transition fit) or differ (loose fit or interference fit). The first position of the at least one eccentric pin 54 is identical to the first position of the at least one pin 52. The second position of the at least one eccentric pin 54 is inserted in the at least one opening 32 of the excentre ring of the rotor lock plate 30 so that the main shaft line is not rotatable and at least one eccentric portion of the at least one eccentric pin 54 acts as a stop and is in contact with the excentre ring of the rotor lock plate 30. FIG. 4 shows the at least one eccentric pin 54 in its third position which is shifted with respect to the pins 54 second position so that the weight of the main shaft line is supported by the pin 54 and so that weight of the main shaft 20 and loads on the main shaft 20 are no longer transmitted through the multi-part main bearing 44 and transferred via the rotor lock plate 30, the pin 54 to the bed plate 40. The shifting of the at least one pin 54 from its second to its third position is performed by a pin actuator 60, wherein the pin actuator 60 actuates the at least one pin 54 in a linear motion, a rotational motion or a combination of linear motion and a rotational motion. The pin actuator 60 can be driven by a hydraulic system, a pneumatic system, an electrical system, or a combination of these. The hydraulic system, pneumatic system, electrical system, or combination of these can drive the pin actuator 60 directly or via a separate drive train system. Due to the actuation of the at least one pin 54 the at least one pin 54 acts as an excentre with the corresponding at least one opening 32 of the rotor lock plate 30 acting as thrust bearing. Furthermore, to support the at least one pin 54 an eccentric socket 56 is inserted in the at least one opening 42 of the bed plate 40. Since the at least one eccentric pin 54 resides in the eccentric socket 56, by actuating the at least one eccentric pin 54 a rotary motion around the center-line of the at least one opening 42 of the bed plate 40 is triggered. Since the at least one eccentric pin 54 has at least two portions along its main axis which have differing center-lines, consequently a rotary motion is impelled upon the rotor lock plate 30 by the portion of the at least one eccentric pin 54 which resides within the at least one opening 32 of the rotor lock plate 30. Therefore, the direct physical contact between bed plate 40 and multi-part main bearing 44 is disengaged.

FIG. 5 shows a wind turbine 10 according to another embodiment of the invention. In this embodiment at least one eccentric pin 54 is used. The at least one pin 54 can have any suitable form and shape, including, but not limited to, circular cross-section, elliptical cross-section, squared cross-section, rectangular cross-section, or any other closed curvature cross-section. Also, the at least one pin 54 has one or more shoulders along its main axis, including one or more eccentric portions which differ from their respective center-lines. Furthermore, the outer shape, geometry and size of the at least one pin 54 and inner shape, geometry and size of the at least one opening 32 of the excentre ring of the rotor lock plate 30 can correspond (transition fit) or differ (loose fit or interference fit). The first position of the at least one eccentric pin 54 is identical to the first position of the at least one pin 52. The second position of the at least one eccentric pin 54 is inserted in the at least one opening 32 of the excentre ring of the rotor lock plate 30 so that the main shaft line is not rotatable and at least one eccentric portion of the at least one eccentric pin 54 acts as a stop and is in contact with the excentre ring of the rotor lock plate 30. FIG. 5 shows the at least one pin 54 in its third position which is shifted with respect to the pins 54 second position so that the weight of the main shaft line is supported by the pin 54 and so that weight of the main shaft 20 and loads on the main shaft 20 are no longer transmitted through the multi-part main bearing 44 and transferred via the rotor lock plate 30, the pin 54 to the bed plate 40. The shifting of the at least one pin 54 from its second to its third position is performed by a pin actuator 60, wherein the pin actuator 60 actuates the ate least one pin 54 in a linear motion, a rotational motion or a combination of linear motion and a rotational motion. The pin actuator 60 can be driven by a hydraulic system, a pneumatic system, an electrical system, or a combination of these. The hydraulic system, pneumatic system, electrical system, or combination of these can drive the pin actuator 60 directly or via a separate drive train system. Due to the actuation of the at least one pin 54 the at least one pin 54 acts as an excentre with the corresponding at least one opening 32 of the rotor lock plate 30 acting as thrust bearing. Furthermore, to support the at least one pin 54 an eccentric socket 56 is inserted in the at least one opening 32 of the rotor lock plate 30. Since the at least one eccentric pin 54 resides in the eccentric socket 56, by actuating the at least one eccentric pin 54 a rotary motion around the center-line of the at least one opening 42 of the bed plate 40 is triggered. Since the at least one eccentric pin 54 has at least two portions along its main axis which have differing center-lines, consequently a rotary motion is impelled upon the rotor lock plate 30 by the portion of the at least one eccentric pin 54 which resides within the eccentric socket 56 which resides within the at least one opening 32 of the rotor lock plate 30. Therefore, the direct physical contact between bed plate 40 and multi-part main bearing 44 is disengaged.

FIGS. 6A through 6F show possible main shaft line movement behaviors when utilizing at least one pin 54. The illustrated possible main shaft line movements are only exemplarily and the method and apparatus described herein are not limited to the displayed main shaft line movements. In all FIGS. 6A-6F, the at least one pin 54 is positioned within the outer ring, which symbolizes the corresponding bore belt of the at least one opening 32 of the rotor lock plate 30. Also, in all FIGS. 6A-6F the curved arrows indicate the rotation of the center line of the eccentric part of the at least one eccentric pin 54 (see also FIG. 4 and FIG. 5). Furthermore, in all FIGS. 6A-6F the dotted line indicates corresponding positions during the rotation of the at least one pin 54.

In FIG. 6A, one pin 54 of an embodiment of the invention according to FIG. 4 or FIG. 5 in the uppermost opening 32 of the rotor lock plate 30 is rotated 180 degrees counter-clockwise. Due to the rotation of the eccentric pin 54 the main shaft line performs a combined vertical and horizontal movement which, due to the rotation of the pin 54 by 180 degrees, results in an identical main shaft lines initial horizontal position compared to the main shaft lines initial horizontal position but an altered main shaft line vertical position compared to the main shaft lines initial vertical position. Since the pin 54 is placed in the uppermost opening 54 the weight of the main shaft 20 acts as balancing weight which supports the horizontal end position of the main shaft line being identical to its initial horizontal position.

In FIG. 6B, one pin 54 in the lowermost opening 32 of the rotor lock plate 30 is rotated 180 degrees counter-clockwise. Due to the rotation of the eccentric pin 54 the main shaft line would perform a combined vertical and horizontal movement. In this configuration the main shaft 20 is supported in its horizontal direction, which disallows the main shaft 20 to move/drift horizontally. Therefore, the rotation of the pin 54 results in an identical main shaft line horizontal position compared to the main shaft lines initial horizontal position but an altered main shaft line vertical position compared to main shaft lines initial vertical position.

In FIG. 6C, two pins 54 in the third and forth quadrant of the bore belt ring are simultaneously rotated 90 degrees clockwise. Due to the rotation of the eccentric pins 54 the main shaft line performs a combined vertical and horizontal movement which, due to the rotation of the pin 54 by 90 degrees, results in an altered main shaft line horizontal position compared to the main shaft lines initial horizontal position and an altered main shaft line vertical position compared to the main shaft lines initial vertical position.

In FIG. 6D, two pins 54 on the horizontal centerline of the bore belt ring are simultaneously rotated 90 degrees clockwise. Due to the rotation of the eccentric pins 54 the main shaft line performs a combined vertical and horizontal movement which, due to the rotation of the pin 54 by 90 degrees, results in an altered main shaft line horizontal position compared to the main shaft lines initial horizontal position and an altered main shaft line vertical position compared to the main shaft lines initial vertical position.

In FIG. 6E, two pins 54 on the vertical centerline of the bore belt ring are simultaneously rotated, the upper pin 54 90 degrees counter-clockwise and the lower pin 54 90 degrees clockwise. Due to the rotation of the eccentric pins 54 the main shat line performs a combined vertical and horizontal movement which, due to the rotation of the pin 54 by 90 degrees in non-identical rotational directions, results in an altered main shaft line horizontal position compared to the main shaft lines initial horizontal position and an altered main shaft line vertical position compared to the main shaft lines initial vertical position.

In FIG. 6F, two pins 54 on the vertical centerline of the bore belt ring are simultaneously rotated 90 degrees clockwise. Due to the rotation of the eccentric pins 54 the main shaft line performs a combined vertical and horizontal movement which, due to the rotation of the pin 54 by 90 degrees in identical rotational directions, results in an altered main shaft line horizontal position compared to the main shaft lines initial horizontal position and an altered main shaft line vertical position compared to the main shaft lines initial vertical position.

FIG. 7 shows a wind turbine 10 according to another embodiment of the invention. In this embodiment at least one pin 55 with integrated pin actuator 60 is used. The at least one pin 55 can have any suitable form and shape, including, but not limited to, circular cross-section, elliptical cross-section, squared cross-section, rectangular cross-section, or any other closed curvature cross-section. Also, the at least one pin 55 can have multiple cross-sections along its main axis, which can have any suitable form and shape, including, but not limited to, circular cross-section, elliptical cross-section, squared cross-section, rectangular cross-section, or any other closed curvature cross-section. Further, the at least one pin 55 can have one or more shoulders along its main axis, including one or more eccentric portions which differ from their respective center-lines. Also, the at least one pin has one or more recesses along its main axis, wherein the one or more recesses can differ from the cross-sections present in other regions along the at least one pins main axis. The cross-section of the one or more recesses can have any suitable form and shape, including, but not limited to, circular cross-section, elliptical cross-section, squared cross-section, rectangular cross-section, or any other closed curvature cross-section. Also, the one or more recesses along the main axis of the at least one pin 55 can have any suitable length along the at least one pins 55 main axis. Preferably the length of at least one of the one or more recesses along the main axis of the at least one pin 55 is at least the width of the rotor lock plate 30, but not less than the width of the at least one opening 32 of the excentre ring of the rotor lock plate 30. Furthermore, the outer shape, geometry and size of the at least one pin 55 and inner shape, geometry and size of the at least one opening 32 of the excentre ring of the rotor lock plate 30 can correspond (transition fit) or differ (loose fit or interference fit). Preferably a loose fit of the at least one pin 55 and the at least one opening 32 of the excentre ring of the rotor lock plate 30 is present. The first position of the at least one pin 55 is identical to the first position of the at least one pin 54. The second position of the at least one pin 55 is inserted in the at least one opening 32 of the excentre ring of the rotor lock plate 30 so that the main shaft line is not rotatable and the center of the at least one recess of the at least one pin 55 is situated colinear to the center of the width of the at least one opening 32 of the excentre ring of the rotor lock plate 30.

FIGS. 8A-8C show details of sectional views A-A through the rotor lock plate 30, as exemplarily indicated in FIG. 6. All figures FIG. 8A-8C show the rotor lock plate 30, the at least one opening 32 of the excentre ring of the rotor lock plate 30, at least one pin 55 with integrated pin actuator 60, and the pin actuator 60.

In FIG. 8A the at least one pin 55 with integrated pin actuator 60 is shown in its second position. In the second position of the at least one pin 55 with integrated pin actuator 60, the pin actuator 60 is not engaged. In this state, the perimeter and cross-section area of the combination of the at least one pin 55 with integrated pin actuator 60 and the pin actuator 60 is less than the perimeter and cross-section area of the at least one opening 32 of the excentre ring of the rotor lock plate 30. Therefore, the combination of the at least one pin 55 with integrated pin actuator 60 and the pin actuator 60 have a loose fit with the at least one opening 32 of the excentre ring of the rotor lock plate 30 and allow the combination of the at least one pin 55 with integrated pin actuator 60 and the pin actuator 60 to be inserted in the at least one opening 32 of the excentre ring of the rotor lock plate 30, thus to be situated in the in FIG. 8a shown second position.

In FIG. 8B the at least one pin 55 with integrated pin actuator 60 is shown transitioning form its second to its third position. The at least one pins 55 third position is shifted with respect to the pins 55 second position so that the weight of the main shaft line is supported by the pin 54 and so that weight of the main shaft 20 and loads on the main shaft 20 are no longer transmitted through the multi-part main bearing 44 and transferred via the rotor lock plate 30, the pin 55 to the bed plate 40. The shifting of the at least one pin 55 from its second to its third position is performed by a pin actuator 60, wherein the pin actuator 60 actuates the ate least one pin 55 in a linear motion, a rotational motion or a combination of linear motion and a rotational motion. The pin actuator 60 can be driven by a hydraulic system, a pneumatic system, an electrical system, or a combination of these. The hydraulic system, pneumatic system, electrical system, or combination of these can drive the pin actuator 60 directly or via a separate drive train system. Due to the actuation of the at least one pin 55 the at least one pin 55 and the pin actuator 60 disengage from one another. As shown in FIG. 8B, first the pin actuator 60 contacts the at least one opening 32 of the excentre ring of the rotor lock plate 30 and any initial spacing between the pin actuator 60 and the at least one opening 32 is reduced to zero.

In FIG. 8C the at least one pin 55 with integrated pin actuator 60 is shown transitioning form its second to its third position. The at least one pins 55 third position is shifted with respect to the pins 55 second position so that the weight of the main shaft line is supported by the pin 54 and so that weight of the main shaft 20 and loads on the main shaft 20 are no longer transmitted through the multi-part main bearing 44 and transferred via the rotor lock plate 30, the pin 55 to the bed plate 40. The shifting of the at least one pin 55 from its second to its third position is performed by a pin actuator 60, wherein the pin actuator 60 actuates the ate least one pin 55 in a linear motion, a rotational motion or a combination of linear motion and a rotational motion. The pin actuator 60 can be driven by a hydraulic system, a pneumatic system, an electrical system, or a combination of these. The hydraulic system, pneumatic system, electrical system, or combination of these can drive the pin actuator 60 directly or via a separate drive train system. Due to the actuation of the at least one pin 55 the at least one pin 55 and the pin actuator 60 disengage from one another. As shown in FIG. 8C, after the pin actuator 60 contacted the at least one opening 32 of the excentre ring of the rotor lock plate 30, the pin actuator is block from further movement. Therefore, the at least one pin 55 propagates in an opposite direction as the pin actuator 60. This in turn reduced any initial spacing between the pin 55 and the at least one opening 32 to zero. The continued actuation of the pin actuator 60, while the at least one pin 55 still resides in the at least one opening 42 of the bed plate 40, forces the main shaft line to move away from the bed plate 40 and therefore, the direct physical contact between bed plate 40 and multi-part main bearing 44 is disengaged.

FIG. 9 shows a wind turbine 10 according to another embodiment of the invention. The nacelle comprises a bed plate 40 with at least one opening 42 for receiving at least one pin 50, a multi-part main bearing 44, and at least one pin 50. The multi-part main bearing 44 comprises a multi-part main bearing housing 45, a multi-part main bearing inner ring 46, a multi-part main bearing outer ring 47, a first part of multi-part main bearing housing 48, and a second wedge-shaped part of multi-part main bearing housing 58, where the multi-part main bearing 44 is mounted via the multi-part main bearing housing 45 to the bed plate 40. FIG. 9 shows the at least one pin 50 in its second position which is inserted in the at least one opening 32 of the excentre ring of the rotor lock plate 30 so that the main shaft line is not rotatable.

FIG. 10 shows the wind turbine 10 according to FIG. 9. In FIG. 10 the at least one pin 50 in its second position which is inserted in the at least one opening 32 of the excentre ring of the rotor lock plate 30 so that the main shaft line is not rotatable. In FIG. 10 the second wedge-shaped part of the multi-part main bearing housing 58 is removed so that the weight of the main shaft line is supported by the pin 50 and so that weight of the main shaft 20 and loads on the main shaft 20 are no longer transmitted through the multi-part main bearing 44 and transferred via the rotor lock plate 30, the pin 50 to the bed plate 40.

FIG. 11 shows the sectional view B-B of FIG. 9. The main shaft line comprises a rotor lock plate 30 with an excentre ring, the excentre ring comprising at least one opening 32 for receiving at least one pin 50. The nacelle comprises a bed plate 40 with at least one opening 42 for receiving at least one pin 50, a multi-part main bearing 44, and at least one pin 50. The multi-part main bearing 44 comprises a multi-part main bearing housing 45, a multi-part main bearing inner ring 46, a multi-part main bearing outer ring 47, a first part of multi-part main bearing housing 48, and a second wedge-shaped part of multi-part main bearing housing 58, where the multi-part main bearing 44 is mounted via the multi-part main bearing housing 45 to the bed plate 40.

FIGS. 12A-12C show sectional views C-C through the multi-part main bearing 44 as exemplarily indicated in FIG. 9. These sectional views also hold true for all other preceding discussed figures. All figures FIG. 12A-12C show the main shaft 20, the bed plate 40, the multi-part main bearing 44, and the multi-part main bearing housing 45.

In FIG. 12A the multi-part main bearing 44 is shown in its assembled state. In this configuration the multi-part main bearing housing 45 features a split in the horizontal direction. In the assembled state the parts of the multi-part main bearing housing 45 are attached to one another as well as to the bed 40 by any means suitable. Such means can be, but are not limited to, screws, bolts, interference-fit of the parts which have to be attached, clamping-devices, and hydraulic devices.

In FIG. 12B the multi-part main bearing 44 is shown in its assembled state. In this configuration the multi-part main bearing housing 45 features a split in the vertical direction. In the assembled state the parts of the multi-part main bearing housing 45 are attached to one another as well as to the bed 40 by any means suitable. Such means can be, but are not limited to, screws, bolts, interference-fit of the parts which have to be attached, clamping-devices, and hydraulic devices.

In FIG. 12C the multi-part main bearing 44 is shown in its disassembled state. In this configuration the sub-parts of the multi-part main bearing housing 45, here exemplarily shown in a vertical-split configuration while the teaching also holds true for a horizontal-split configuration, they are detached from one another as well as from the bed plate 40. Due to its multi-part design, the multi-part main bearing housing 45 can be disassembled to its comprising sub-parts in the process of disassembling the multi-part main bearing housing 45 and can be assembled form its comprising sub-parts in the process of assembling the multi-part main bearing 45. In the state shown in FIG. 12C the sub-parts of the multi-part main bearing housing 45 can be exchanged or revisited.

FIGS. 13A-13C show sectional views D-D through the multi-part main bearing 44 as exemplarily indicated in FIG. 11. These sectional views also hold true for all other preceding discussed figures. All figures FIG. 13A-13C show the main shaft 20, and the multi-part main bearing 44 as well as the multi-part main bearing inner ring 46 and the multi-part main bearing outer ring 47.

In FIG. 13A the multi-part main bearing 44 is shown in its assembled state. In this configuration the multi-part main bearing inner ring 46 is inserted and axially aligned within the multi-part main bearing outer ring 47. Both, the multi-part main bearing inner ring 46 and the multi-part main bearing outer ring 47 feature a semi-radial interference fit at the interface surface. The multi-part main bearing outer ring 47 is a part of the multi-part main bearing housing 45, represents the multi-part main bearing housing 45 or a combination of both.

In FIG. 13B the multi-part main bearing 44 is shown in an intermediate state, where the multi-part main bearing inner ring 46 is shifted from its axial alignment position with the multi-part main bearing outer ring 47. This shift is performed by an actuator not shown which is capable of altering the axial position of the multi-part main bearing inner ring 46 and especially is capable of overcoming the forces of the interference fit between the multi-part main bearing inner ring 46 and the multi-part main bearing outer ring 47. In the process of disassembling the multi-part main bearing 44 the multi-part main bearing inner ring 46 is shifted from its axial alignment position towards a position where no physical contact between the multi-part main bearing inner ring 46 and the multi-part main bearing outer ring 47 as well as the main shaft 20 is present. In the process of assembling the multi-part main bearing 44 the multi-part main bearing inner ring 46 is shifted form a position where no physical contact between the multi-part main bearing inner ring 46 and the multi-part main bearing outer ring 47 as well as the main shaft 20 is present towards a position where the multi-part main bearing inner ring 46 is axially aligned with the multi-part main bearing outer ring 47 and an interference fit on the semi-radial interface surface of the multi-part main bearing inner ring 46 and the multi-part main bearing outer ring 47 is achieved.

In FIG. 13C the multi-part main bearing 44 is shown in its disassembled state. In this configuration the multi-part main bearing inner ring 46, due to its multi-part design, can be disassembled to its comprising sub-parts in the process of disassembling the multi-part main bearing 44 or the multi-part main bearing inner ring 46 can be assembled form its comprising sub-parts in the process of assembling the multi-part main bearing 44. In the state shown in FIG. 13C the sub-parts of the multi-part main bearing inner ring 46 can be exchanged or revisited.

Discussion of Further Details, Possible Variants and Common Aspects

Possible variants and general optional aspects of the invention are further described. Here, unless excluded, any aspect may be combined with any other aspect of the invention. The aspects are also referred to as embodiments and are illustrated in part by reference signs which refer to the elements shown in the figures previously described, but without being limited in any further respect to the embodiments shown therein.

In a selected embodiment, a wind turbine 10 comprises a main shaft line and a nacelle. The main shaft line comprises a main shaft 20, a rotor hub, a rotor lock plate 30 with an excentre ring, the excentre ring featuring at least one opening 32 for receiving at least one pin 50. The nacelle comprises a bed plate 40, a multi-part main bearing 44, and at least one pin 50, wherein the multi-part main bearing 44 comprising a multi-part main bearing housing 45, a multi-part main bearing inner ring 46, and a multi-part main bearing outer ring 47.

The multi-part main bearing inner ring 46 is axially aligned with the multi-part main bearing outer ring 47, while the multi-part main bearing inner ring 46 and the multi-part main bearing outer ring 47 both have a semi-radial surface on which both are fitted together using an interference fit. The multi-part main bearing outer ring 47 is a part of the multi-part main bearing housing 45, represents the multi-part main bearing housing 45 or a combination of both.

The at least one pin 50 is moveable between a first position, a second position, and a third position. In the first position the at least one pin 50 is retracted from the at least one opening 32 of the rotor lock plate 30 so that the main shaft line is rotatable. In the second position the at least one pin 50 is inserted into the at least one opening 32 of the rotor lock palate 30 so that the main shaft line is not rotatable. In the third position the at least one pin 50 is shifted with respect to the second position so that the weight of the main shaft line is supported by the at least one pin 50 and so that the weight of the main shaft 20 and loads on the main shaft 20 are no longer transmitted through the multi-part main bearing 44 and are transferred via the rotor lock plate 30, the at least one pin 50 to the bed plate 40.

In a preferred embodiment, the at least one pin 50 can have any suitable form and shape, including, but not limited to, circular cross-section, elliptical cross-section, squared cross-section, rectangular cross-section, or any other closed curvature cross-section. Also, the at least one pin 50 can have none or one or more shoulders along its main axis, including one or more eccentric portions which differ from their respective center-lines.

In a preferred embodiment, the at least one pin 50 connects the rotor lock plate 30 via the at least one opening 32 within the rotor lock plate 30 to the bed plate 40. Therefore, the main shaft line can be supported by the rotor lock plate 30 and the multi-part main bearing 44 can become load-less form loads and weight from the main shaft 20. This in turn, allows components or all of the multi-part main bearing 44 to be maintained, repaired, or replaced.

In a preferred embodiment, the outer shape, geometry and size of the at least one pin 50 and inner shape, geometry and size of the at least one opening 32 of the excentre ring of the rotor lock plate 30 can correspond (transition fit) or differ (loose fit or interference fit).

In a preferred embodiment, the wind turbine 10 further comprises a pin actuator 60, wherein the pin actuator 60 actuates the at least one pin 50 in a linear motion, a rotational motion or a combination of linear motion and rotational motion. A linear motion can be performed on every axis of the at least one pin 50, wherein a linear motion along an axis of the at least one pin 50 represents a movement of the at least one pin 50 along this axis. A rotational motion can be performed around every axis of the at least one pin 50, wherein a rotational motion around an axis of the at least one pin 50 represents a rotation of the pin. Every possible combination of one or more linear motions and one or more rotational motions of the at least one pin is possible. Furthermore, linear motions and rotational motions are not limited to the at least one pins 50 main axis and therefore can be applied with respect to every point on or within the at least on pin 50. Thus, the at least one pin 50 can be used as lever with one or more thrust bearing supports, the thrust bearing supports representing points of applied motion.

In a preferred embodiment, the pin actuator 60 can be driven by an operator, a hydraulic system, a pneumatic system, an electrical system, or a combination of these. The operator, hydraulic system, pneumatic system, electrical system, or combination of these can drive the pin actuator 60 directly or via a separate drive train system.

In a preferred embodiment, the at least one pin 50 alters the predominant vertical position of the main shaft line by altering the predominant vertical position of the rotor lock plate 30. When the at least one pin 50 is in its second position the at least one pin 50 is actuated by the pin actuator 60. By this actuation the at least one pin 50 is shifted with respect to its second position and takes a new position, the third position, as a result of this shifting movement. Since the at least one pin 50 is inserted into the at least one opening 32 of the rotor lock plate 30 when the at least one pin 50 is in its second position, the shifting movement from the at least one pins 50 second position to the at least one pins 50 third position also affects the rotor lock plate 30. When a shifting movement is applied which affects the at least one pins 50 vertical position a corresponding shifting movement takes place at the rotor lock plate 30. Since the rotor lock plate 30 is coupled to the main shaft line, a corresponding shifting movement takes place with respect to main shaft line. Therefore, shifting movements of the at least one pin 50 induce corresponding shifting movements of the rotor lock plate 30 and the main shaft line.

In a preferred embodiment, the at least one pin 50 is configured to act as lever, wherein the at least one pin 52 is actuated by the pin actuator 60 to alter the predominant vertical position of the main shaft line by altering the predominant vertical position of the rotor lock plate 30. By using the at least one pin 52 as lever one or more thrust bearings are necessary to achieve such a behavior. One possible thrust bearing is the at least one opening 32 of the rotor lock plate. Another possible thrust bearing is the at least one opening 42 of the bed plate 40. The at least one pin 52 can have any geometrical form and structure which is suitable for the at least one pin 52 to act as a lever. Possible geometrical forms and structures are, but are not limited to these, cylindrical shape, cylindrical shape with one or more implementations, elliptical shape, elliptical shape with one or more implementations, rectangular shape, or rectangular shape with one or more implementations. The one or more possible implementations can have any geometrical form or structure which is suitable, like, but not limited to these, a sphere shape, an ellipsoid shape, or a polyhedron shape. The one or more possible implementations can be positioned at any point of the at least one pin 52 and can be of any suitable size.

In a preferred embodiment, the at least one pin 52 can have any suitable form and shape, including, but not limited to, circular cross-section, elliptical cross-section, squared cross-section, rectangular cross-section, or any other closed curvature cross-section. Also, the at least one pin 52 can have none or one or more shoulders along its main axis, including one or more eccentric portions which differ from their respective center-lines.

In a preferred embodiment, the outer shape, geometry and size of the at least one pin 52 and inner shape, geometry and size of the at least one opening 32 of the excentre ring of the rotor lock plate 30 can correspond (transition fit) or differ (loose fit or interference fit).

When the at least one pin 52 is in its second position the at least one pin 52 is actuated by the pin actuator 60. By this actuation the at least one pin 52 is shifted with respect to its second position and takes a new position, the third position, as a result of this shifting movement. Since the at least one pin 52 is inserted into the at least one opening 32 of the rotor lock plate 30 when the at least one pin 52 is in its second position, the shifting movement from the at least one pins 52 second position to the at least one pins 52 third position also affects the rotor lock plate 30. When a shifting movement is applied which affects the at least one pins 52 vertical position a corresponding shifting movement takes place at the rotor lock plate 30. Since the rotor lock plate 30 is coupled to the main shaft line, a corresponding shifting movement takes place with respect to main shaft line. Therefore, shifting movements of the at least one pin 52 induce corresponding shifting movements of the rotor lock plate 30 and the main shaft line.

In a preferred embodiment, the at least one pin 50 is configured as an excentre mechanism, wherein the at least one pin 54 is actuated by the pin actuator 60 to alter the predominant vertical position of the main shaft line by altering the predominant vertical position of the rotor lock plate 30. When the at least one pin 54 is configured as an excentre mechanism, the at least one pin 54 features at least two section. These at least two sections are configured to have at least to eccentric axis. When the at least one pin 54 is in its second position, at least one section of the at least one pin 54 is inserted into the at least one opening 32 of the rotor lock plate 30 and at least one section of the at least one pin 54 is inserted in the at least one opening 42 of the bed plate 40. If a section of the at least one pin 54 does not fill the corresponding at least one opening 32 of the rotor lock plate 30 or the at least one opening 42 of the bed plate 40 completely a socket 56 is inserted at least one opening 32 of the rotor lock plate 30 or the at least one opening 42 of the bed plate 40 so that the opening is completely filled by the at least one section of the least one pin 54 and the socket 56. The socket 56 features an off-axis bore hole which matches the outer outline of the corresponding at least one section of the at least one pin 54.

In a preferred embodiment, the at least one pin 54 can have any suitable form and shape, including, but not limited to, circular cross-section, elliptical cross-section, squared cross-section, rectangular cross-section, or any other closed curvature cross-section. Also, the at least one pin 54 can have none or one or more shoulders along its main axis, including one or more eccentric portions which differ from their respective center-lines.

In a preferred embodiment, the outer shape, geometry and size of the at least one pin 54 and inner shape, geometry and size of the at least one opening 32 of the excentre ring of the rotor lock plate 30 can correspond (transition fit) or differ (loose fit or interference fit).

When the at least one pin 54 is in its second position the at least one pin 54 is actuated by the pin actuator 60. By this actuation the at least one pin 54 is shifted with respect to its second position and takes a new position, the third position, as a result of this shifting movement. Since the at least one pin 54 is inserted into the at least one opening 32 of the rotor lock plate 30 when the at least one pin 54 is in its second position, the shifting movement from the at least one pins 54 second position to the at least one pins 54 third position also affects the rotor lock plate 30. When a shifting movement is applied which affects the at least one pins 54 vertical position a corresponding shifting movement takes place at the rotor lock plate 30. Since the rotor lock plate 30 is coupled to the main shaft line, a corresponding shifting movement takes place with respect to main shaft line. Therefore, shifting movements of the at least one pin 54 induce corresponding shifting movements of the rotor lock plate 30 and the main shaft line.

In a preferred embodiment, the at least one pin 50 is configured to feature an integrated pin actuator 60, wherein the at least one pin 55 is actuated by the pin actuator 60 to alter the predominant vertical position of the rotor hub by altering the predominant vertical position of the rotor lock plate 30. When the at least one pin 55 is configured to feature an integrated pin actuator 60, the at least one pin 55 features at least one recess along the at least one pins 55 main axis. The at least one recess of the at least one pin 55 can differ from the cross-sections present in other regions along the at least one pins main axis. The cross-section of the one or more recesses can have any suitable form and shape, including, but not limited to, circular cross-section, elliptical cross-section, squared cross-section, rectangular cross-section, or any other closed curvature cross-section. Also, the one or more recesses along the main axis of the at least one pin 55 can have any suitable length along the at least one pins 55 main axis. Preferably the length of at least one of the one or more recesses along the main axis of the at least one pin 55 is at least the width of the rotor lock plate 30, but not less than the width of the at least one opening 32 of the excentre ring of the rotor lock plate 30. Further, the at least one pin 55 can have one or more shoulders along its main axis, including one or more eccentric portions which differ from their respective center-lines.

In a preferred embodiment, the at least one pin 55 can have any suitable form and shape, including, but not limited to, circular cross-section, elliptical cross-section, squared cross-section, rectangular cross-section, or any other closed curvature cross-section. Further, the at least one pin 55 can have one or more recesses along its main axis. Also, the at least one pin 55 can have none or one or more shoulders along its main axis, including one or more eccentric portions which differ from their respective center-lines.

When the at least one pin 55 is in its second position, at least one section of the at least one pin 55 is inserted into the at least one opening 32 of the rotor lock plate 30 and at least one section of the at least one pin 55 is inserted in the at least one opening 42 of the bed plate 40. At least one section of the at least one pin 55 fills the corresponding at least one opening 42 of the bed plate 40 completely and forms any suitable fit (loose fit, transition fit, interference fit). At least one section of the at least one 55 does not fill the corresponding at least one opening 32 of the rotor lock plate 30 completely, and therefore forms a loose fit or transition fit between the at least one section of the at least one pin 55 and the corresponding at least one opening 32 of the rotor lock plate 30. This allows the at least one pin 55 to propagate into the at least one opening 32 of the rotor lock plate and engage its second position.

In a preferred embodiment, the outer shape, geometry and size of the at least one pin 55 and inner shape, geometry and size of the at least one opening 32 of the excentre ring of the rotor lock plate 30 can correspond (transition fit) or differ (loose fit or interference fit).

When the at least one pin 55 is in its second position the at least one pin 55 is actuated by the pin actuator 60. By this actuation the at least one pin 55 is shifted with respect to its second position and takes a new position, the third position, as a result of this shifting movement. Since the at least one pin 55 is inserted into the at least one opening 32 of the rotor lock plate 30 when the at least one pin 55 is in its second position, the shifting movement from the at least one pins 55 second position to the at least one pins 54 third position also affects the rotor lock plate 30. When a shifting movement is applied which affects the at least one pins 55 vertical position a corresponding shifting movement takes place at the rotor lock plate 30. Since the rotor lock plate 30 is coupled to the main shaft line, a corresponding shifting movement takes place with respect to main shaft line. Therefore, shifting movements of the at least one pin 55 induce corresponding shifting movements of the rotor lock plate 30 and the main shaft line.

In a preferred embodiment, the at least one pin 52 is actuated by the pin actuator 60 to alter the predominant vertical position of the main shaft line at the position of multi-part main bearing 44 while the at least one pin 54 is used to secure the altered predominant vertical position of the main shaft line. Herein, the at least one pin 52 is configured to act as a lever, while the at least one pin 54 is configured as an excentre mechanism. By actuating the at least one pin 52, which is configured to act as a lever, the predominant vertical position of the main shaft line is altered at the position of multi-part main bearing 44 by shifting the at least one pin 52 from its second position to its third position. When the at least one pin 52 reaches its third position the at least one pin 54, which is configured as an excentre mechanism, is used to secure the altered predominant vertical position of the main shaft line by resisting possible loads from the main shaft. This resistance can be applied by a pin actuator 60, a thrust bearing or any other suitable means.

In a preferred embodiment, the at least one pin 50, the at least one pin 52 in the pin-lever mechanism, the at least one pin 54 in the pin-excentre mechanism and the at least one socket 56 in the pin-excentre mechanism, and the at least one pin 55 with integrated pin actuator can be interchanged with one another at each and every first position, second position, or third position of the respective pin.

In a preferred embodiment, the at least one pin 50 in its second position is interchanged with the at least one pin 52 of the pin-lever mechanism, which subsequently is shifted with respect to the pins second position to the pins 52 third position.

In a preferred embodiment, the at least one pin 50 in its second position is interchanged with the at least one pin 54 of the pin-excentre mechanism, which subsequently is shifted with respect to the pins second position to the pins 52 third position. Additionally, the at least one socket 56 of the pin-excentre mechanism is introduced while interchanging the at least one pin 50 with the at least one pin 54 of the pin-excentre mechanism.

In a preferred embodiment, the at least one pin 50 is its second position is interchanged with the at least one pin 55 with integrated pin actuator, which subsequently is shifted with respect to the pins second position to the pins 55 third position.

In a selected embodiment, a wind turbine 10 comprises a main shaft line and a nacelle. The main shaft line comprises a main shaft, a rotor hub, a rotor lock plate 30 with an excentre ring, the excentre ring featuring at least one opening 32 for receiving at least one pin 50. The nacelle comprises a bed plate 40, a multi-part main bearing 44, and at least one pin 50, wherein the multi-part main bearing 44 comprising a multi-part main bearing housing 45, a multi-part main bearing inner ring 46, and a multi-part main bearing outer ring 47, wherein the multi-part main bearing housing 45 comprises a support which rests on the bed plate 40, the support comprising a first part 48 connected to the multi-part main bearing 44 and a second part 58 abutting the bed plate 40, wherein the second part 58 is wedge-shaped and is removable between the first part 48 and the bed plate 40.

The multi-part main bearing 44 and the multi-part main bearing housing 45 can be split in multiple parts along each suitable plane. Preferably, the multi-part main bearing 44 and the multi-part main bearing housing 45 are split in at least two parts in a horizontal or vertical direction.

The multi-part main bearing inner ring 46 is axially aligned with the multi-part main bearing outer ring 47, while the multi-part main bearing inner ring 46 and the multi-part main bearing outer ring 47 both have a semi-radial surface on which both are fitted together using an interference fit. The multi-part main bearing outer ring 47 is a part of the multi-part main bearing housing 45, represents the multi-part main bearing housing 45 or a combination of both.

The at least one pin 50 is moveable between a first position, and a second position. In the first position the at least one pin 50 is retracted from the at least one opening 32 of the rotor lock plate 30 so that the main shaft line is rotatable. In the second position the at least one pin 50 is inserted into the at least one opening 32 of the rotor lock palate 30 so that the main shaft line is not rotatable.

In a preferred embodiment, the disengagement of the wedge-shaped second part 58 shifts the support of the rotor hub to the bed plate 40 via the rotor lock plate 30 and the at least one pin 50 with elliptical cross-section area. When the at least one pin 50 is in its second position the wedge-shaped second part 58 can be disengaged and removed from the multi-part main bearing 44 and bed plate 40 assembly. When the wedge-shaped second part 58 is removed the main shaft line is supported by bed plate 40 via the at least one pin 50 and the rotor lock plate 30 and the multi-part main bearing 44 can become load-less form loads and weight from the main shaft 20. This in turn, allows components or all of the multi-part main bearing 44 to be maintained, repaired, or replaced.

In a preferred embodiment, the predominant horizontal position of the main shaft line is preserved. When inserting the at least one pin 50 at certain positions (e. g. the uppermost opening 32 of the rotor lock plate 30 or utilizing more than one pin 50 the predominant horizontal position of the main shaft line after the shift of the predominant vertical position of the main shaft line is identical or almost identical to the initial predominant horizontal position of the main shaft line before the shift of the predominant vertical position of the main shaft line. Also, other supporting elements can be used to preserve the predominant horizontal position of the rotor either during the shift of the predominant vertical position of the main shaft line or at the resulting end position after the shift of the predominant vertical position of the main shaft line. When the predominant horizontal position of the main shaft line is preserved the overall needed space constrains for the shift in the main shaft lines position can be limited.

In a preferred embodiment, at least one part of the multi-part main bearing inner ring 46 is moveable between a first position, a second position, and a third position, wherein all parts of the multi-part main bearing inner ring 46 are axially aligned to the multi-part main bearing outer ring 47 in the first position, at least one part of the multi-part main bearing inner ring 46 are axially retracted from multi-part main bearing outer ring 47 in the second position, and at least one part of the multi-part main bearing inner ring 46 are removeable from the multi-part main bearing 44 in the third position. Therefore, the at least one part of the multi-part main bearing inner ring 46 can be maintained, repaired, or replaced. When the multi-part main bearing inner ring 46 is removed from the multi-part main bearing 44 the at least one part of multi-part main bearing outer ring 47 can be disassembled which allows for maintenance, repair and replacement of the multi-part main bearing outer ring 47. The same applies for the multi-part main bearing housing 45. Also, the surfaces of the main shaft 20 can be maintained and repaired in the removal state of the multi-part main bearing inner ring 46.

In a selected embodiment, a method for performing a maintenance and/or repair procedure, including the replacement, of the multi-part main bearing 44 of a wind turbine 10 is presented. The method comprising inserting at least one pin 50 into at least one opening 32 of the excentre ring of the main shaft line so that the main shaft line is not rotatable, supporting the main shaft line via the at least one pin 50, wherein the at least one pin 50 connects the main shaft line via the rotor lock plate 30 to the bed plate 40 and thereby making the multi-part main bearing 44 no longer supporting the main shaft line, disengaging contact between the multi-part main bearing housing 45 and the bed plate 40, and performing a maintenance or repair procedure, including the replacement of the multi-part main bearing 44.

In a preferred embodiment, the at least one pin 50 engages from the bed plate 40 to a corresponding opening 32 in the rotor lock plate 30. When the at least one pin 50 is in its first position, the at least one pin 50 is actuated by the pin actuator 60. This actuation shifts the position of the at least one pin 50 outwards of the bed plate 40 and towards the rotor lock plate 30. When the rotor lock plate 30 is positioned correctly the at least one pins 50 movement continues and the at least pin 50 enters the at least one opening 32 of the rotor lock plate 30. The movement of the at least one pin 50 continues until the at least one pin 50 reaches the at least one pins 50 second position.

REFERENCE NUMERALS

- 10 Wind turbine
- 20 Main shaft
- 30 Rotor lock plate
- 32 Opening within the rotor lock plate
- 40 Bed plate
- 42 Opening within the bed plate
- 44 Multi-part main bearing
- 45 Multi-part main bearing housing
- 46 Multi-part main bearing inner ring
- 47 Multi-part main bearing outer ring
- 48 First part of multi-part main bearing housing
- 50 Pin
- 52 Pin in pin-leaver-mechanism
- 54 Pin in pin-excentre-mechanism
- 55 Pin with integrated pin actuator
- 56 Socket in pin-excentre-mechanism
- 58 Second wedge-shaped part of multi-part main bearing housing
- 60 Pin actuator

The invention claimed is:

1. A wind turbine, comprising:
    a main shaft line, the main shaft line comprising a main shaft, a rotor hub, a rotor lock plate comprising an opening for receiving a pin;
    a nacelle, the nacelle comprising:
        a bed plate;
        a multi-part main bearing, the multi-part main bearing comprising a housing, an inner ring, and an outer ring; and
        a pin moveable between a first position, a second position, and a third position, wherein the pin is retracted from the opening in the first position so that the main shaft line is rotatable, wherein the pin is inserted into the opening in the second position so that the main shaft line is not rotatable, and wherein, in the third position, the pin is shifted with respect to the second position so that the main shaft line is supported by the pin such that the weight of shaft and loads on the main shaft are not transmitted through the multi-part main bearing but are transferred via the rotor lock plate and the pin to the bed plate.

2. The wind turbine of claim 1, wherein the pin connects the main shaft line via the rotor lock plate to the bed plate, and wherein the rotor lock plate comprises an excentre ring with the opening defined therein for receiving the pin.

3. The wind turbine of claim 1, further comprising a pin actuator configured to actuate the pin in a linear motion, a rotational motion, or a combination linear and rotational motion.

4. The wind turbine of claim 1, wherein the pin alters a vertical position of the main shaft line at a position of multi-part main bearing in the third position of the pin.

5. The wind turbine of claim 4, wherein the pin is configured as a lever when actuated by the pin actuator to alter the vertical position of the main shaft line.

6. The wind turbine of claim 5, wherein the pin secures the altered vertical position of the main shaft line after being actuated by the pin actuator.

7. The wind turbine of claim 4, wherein the pin is configured as an excentre mechanism when actuated by the pin actuator to rotate and alter the vertical position of the main shaft line.

8. The wind turbine of claim 7, wherein an initial horizontal position of the main shaft line is preserved when the main shaft line is at the altered vertical position.

9. The wind turbine of claim 7, wherein an initial horizontal position of the main shaft line is altered when the main shaft line is at the altered vertical position.

10. The wind turbine of claim 1, wherein at least one part of the inner ring of the multi-part main bearing is moveable between a first position, a second position, and a third position, wherein all parts of the inner ring are axially aligned to the outer ring of the multi-part main bearing in the first position, the at least one part of the inner ring is axially retracted from the outer ring in the second position, and the at least one part of the inner ring is removeable from the multi-part main bearing in the third position.

* * * * *